(12) United States Patent
Meyer

(10) Patent No.: US 9,429,217 B2
(45) Date of Patent: Aug. 30, 2016

(54) CONTINUOUSLY VARIABLE DRIVE MECHANISM

(71) Applicant: Robert Hornblower Meyer, West Bloomfield, MI (US)

(72) Inventor: Robert Hornblower Meyer, West Bloomfield, MI (US)

( * ) Notice: Subject to any disclaimer, the term of this patent is extended or adjusted under 35 U.S.C. 154(b) by 334 days.

(21) Appl. No.: 14/166,336

(22) Filed: Jan. 28, 2014

(65) Prior Publication Data

US 2014/0287868 A1 Sep. 25, 2014

Related U.S. Application Data

(60) Provisional application No. 61/757,373, filed on Jan. 28, 2013, provisional application No. 61/861,952, filed on Aug. 2, 2013, provisional application No. 61/896,183, filed on Oct. 28, 2013.

(51) Int. Cl.
*F16H 15/40* (2006.01)
*F16H 15/42* (2006.01)

(52) U.S. Cl.
CPC .............. *F16H 15/40* (2013.01); *F16H 15/42* (2013.01)

(58) Field of Classification Search
CPC ................................. F16H 15/40; F16H 15/42
See application file for complete search history.

(56) References Cited

U.S. PATENT DOCUMENTS

| | | | |
|---|---|---|---|
| 2,205,031 A * | 6/1940 | Hubbard | F16H 15/42 476/48 |
| 4,435,997 A | 3/1984 | van Doorne | |
| 4,850,235 A * | 7/1989 | Burke | F16H 15/50 476/48 |
| 4,875,894 A | 10/1989 | Clark | |
| 4,905,529 A | 3/1990 | Nakano | |
| 5,645,507 A | 7/1997 | Hathaway | |
| 5,823,911 A | 10/1998 | Hibi | |
| 6,162,144 A | 12/2000 | Haka | |
| 6,524,213 B2 | 2/2003 | Mori | |
| 6,550,353 B2 | 4/2003 | Yuan | |
| 6,645,120 B1 | 11/2003 | Nishio et al. | |
| 6,652,412 B2 | 11/2003 | Sugihara et al. | |
| 6,872,162 B2 | 3/2005 | Inoue et al. | |
| 6,932,739 B2 | 8/2005 | Miyata et al. | |
| 7,033,302 B2 | 4/2006 | Nogi et al. | |
| 7,077,777 B2 | 7/2006 | Miyata et al. | |
| 7,077,780 B2 | 7/2006 | Yamamoto | |
| 7,077,782 B2 | 7/2006 | Mason et al. | |
| 7,285,068 B2 | 10/2007 | Hosoi | |
| 7,335,126 B2 | 2/2008 | Tsuchiya et al. | |
| 7,556,584 B2 | 7/2009 | Souca | |

(Continued)

FOREIGN PATENT DOCUMENTS

| EP | 0486191 A1 | 5/1992 |
|---|---|---|
| EP | 1731796 A2 | 12/2006 |

(Continued)

*Primary Examiner* — David M Fenstermacher
(74) *Attorney, Agent, or Firm* — Checkowsky Law PLLC; Daniel Checkowsky

(57) ABSTRACT

A drive mechanism includes an input member rotatable about an input axis of rotation. The input member includes a partial spheroid-shaped input traction surface. The drive mechanism further includes an output member rotatable about an output axis of rotation. The output member includes a partial spheroid-shaped output traction surface. A ring member overlays the input and output members. The ring member is rotatable in a rotational plane and includes a ring traction surface that engages the input traction surface of the input member and the output traction surface of the output member to rotatably couple the input member to the output member.

30 Claims, 13 Drawing Sheets

(56) References Cited

U.S. PATENT DOCUMENTS

| | | |
|---|---|---|
| 7,670,243 B2 | 3/2010 | Miller |
| 7,727,106 B2 | 6/2010 | Maheu et al. |
| 7,735,438 B2 | 6/2010 | Riewerts |
| 7,883,442 B2 | 2/2011 | Miller et al. |
| 8,147,366 B2 | 4/2012 | Kawasaki et al. |
| 8,287,424 B2 | 10/2012 | Gu et al. |
| 8,382,630 B2 | 2/2013 | Brinks et al. |
| 8,382,636 B2 | 2/2013 | Shiina et al. |
| 8,393,989 B2 | 3/2013 | Pohl |
| 8,398,518 B2 | 3/2013 | Nichols et al. |
| 8,439,151 B2 | 5/2013 | Williams et al. |
| 8,469,856 B2 | 6/2013 | Thomassy |
| 2002/0026842 A1 | 3/2002 | Tomidokoro |
| 2004/0176209 A1* | 9/2004 | Shimazu ............... F16H 15/30 476/64 |
| 2006/0183594 A1* | 8/2006 | Souca ................... F16H 15/42 476/52 |
| 2010/0173743 A1 | 7/2010 | Nichols et al. |
| 2011/0034284 A1 | 2/2011 | Pohl et al. |
| 2011/0088503 A1 | 4/2011 | Armstrong et al. |
| 2011/0105274 A1 | 5/2011 | Lohr et al. |
| 2011/0218072 A1 | 9/2011 | Lohr et al. |
| 2011/0230297 A1 | 9/2011 | Shiina et al. |
| 2011/0281072 A1 | 11/2011 | Sabia et al. |
| 2011/0319222 A1 | 12/2011 | Ogawa et al. |
| 2012/0202644 A1 | 8/2012 | Durack |
| 2013/0095977 A1 | 4/2013 | Smithson et al. |
| 2013/0106258 A1 | 5/2013 | Miller |
| 2013/0123062 A1* | 5/2013 | Okulov ................. F16H 15/40 476/50 |
| 2013/0143708 A1 | 6/2013 | Carter et al. |
| 2013/0146406 A1 | 6/2013 | Nichols et al. |
| 2014/0274552 A1* | 9/2014 | Frink .................... F16H 55/32 476/36 |

FOREIGN PATENT DOCUMENTS

| | | |
|---|---|---|
| EP | 2342479 A1 | 7/2011 |
| EP | 2011224083 A1 | 10/2011 |
| GB | 2438412 A | 11/2007 |
| WO | WO03/089810 A1 | 10/2003 |
| WO | WO2007132231 A1 | 11/2007 |
| WO | WO2010004449 A1 | 1/2010 |
| WO | WO2012/151615 | 11/2012 |
| WO | WO2013/057701 A1 | 4/2013 |

\* cited by examiner

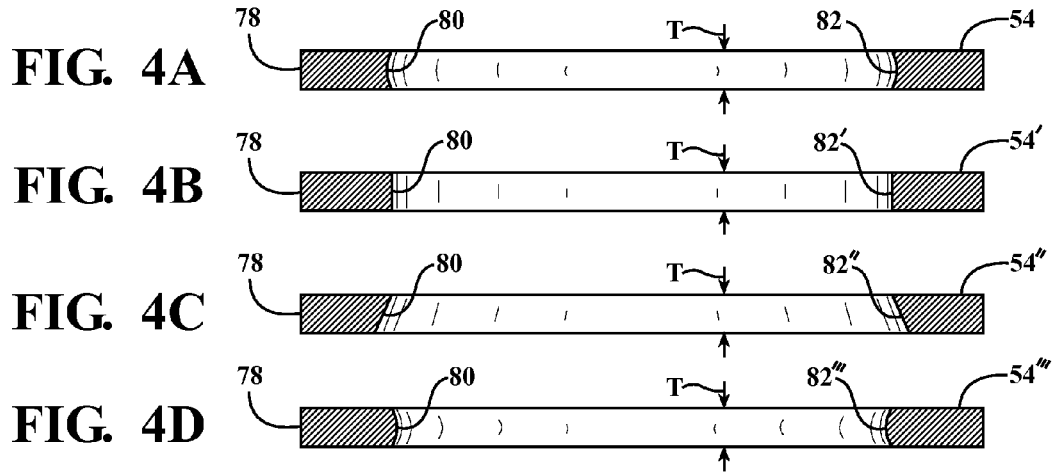
FIG. 4A
FIG. 4B
FIG. 4C
FIG. 4D
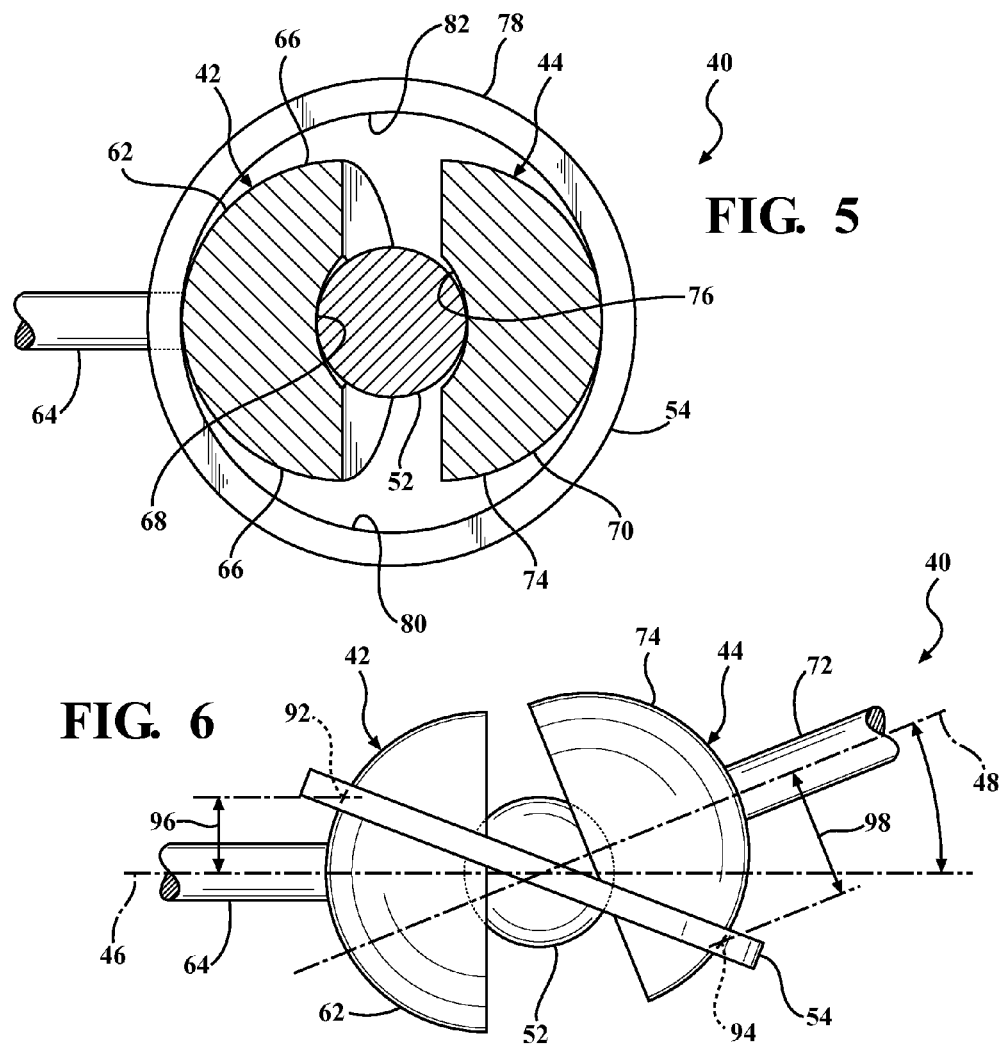
FIG. 5
FIG. 6

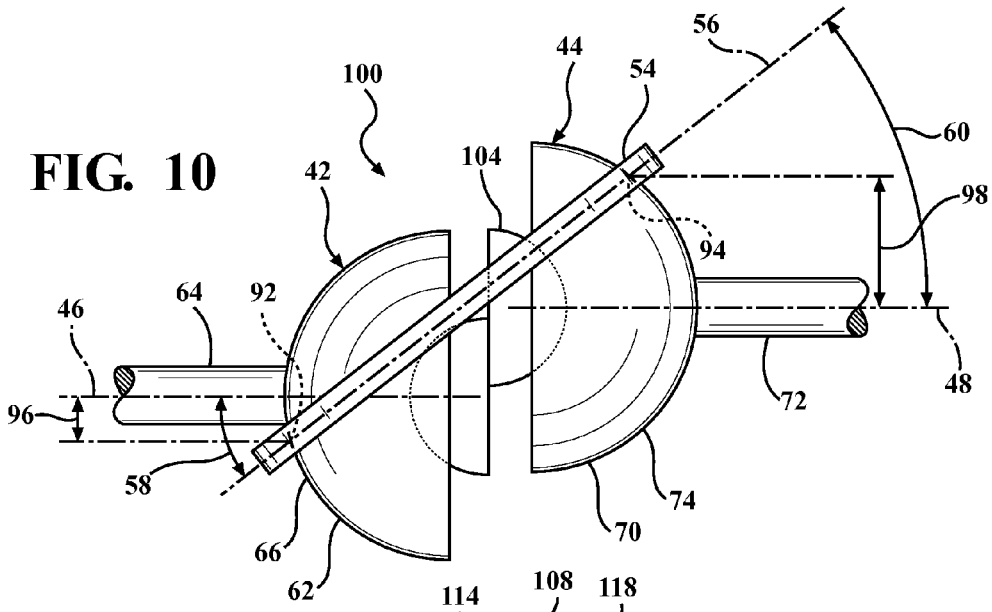
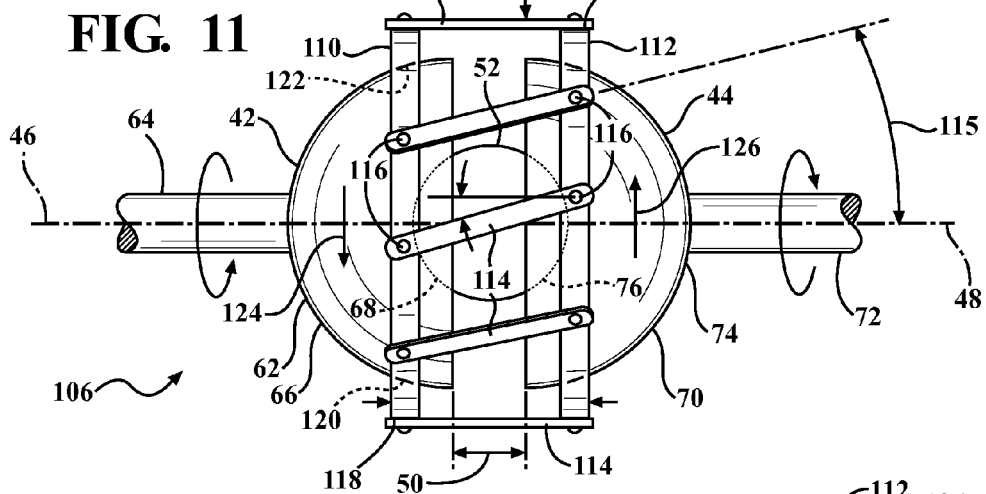
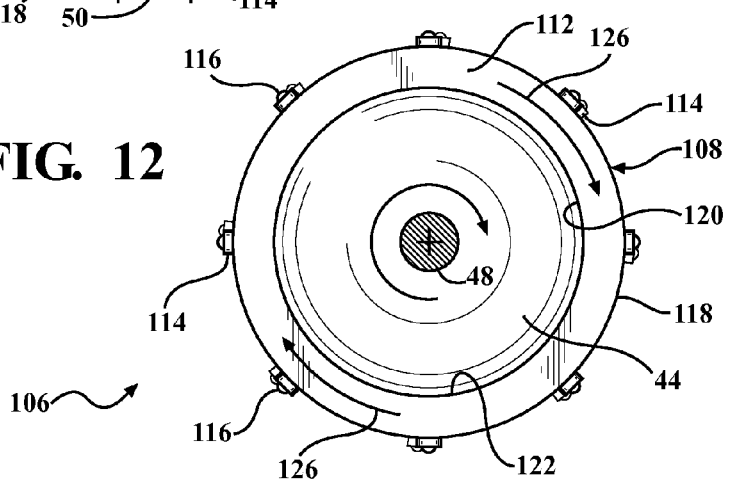

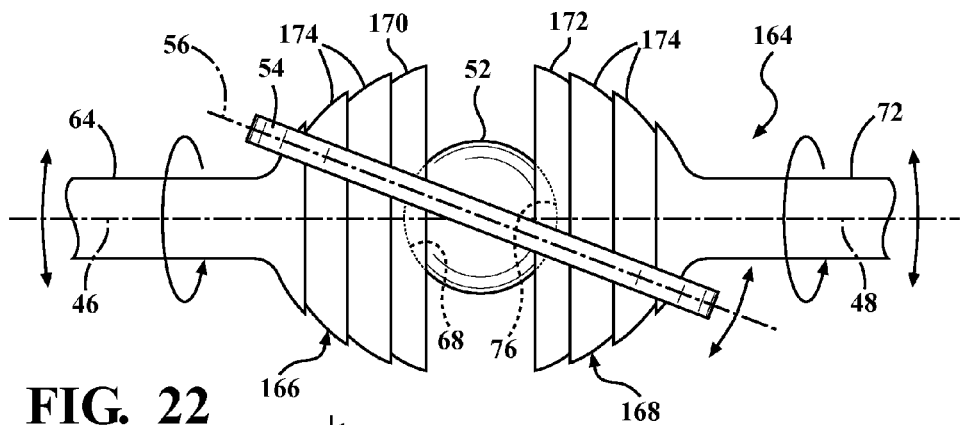
FIG. 22
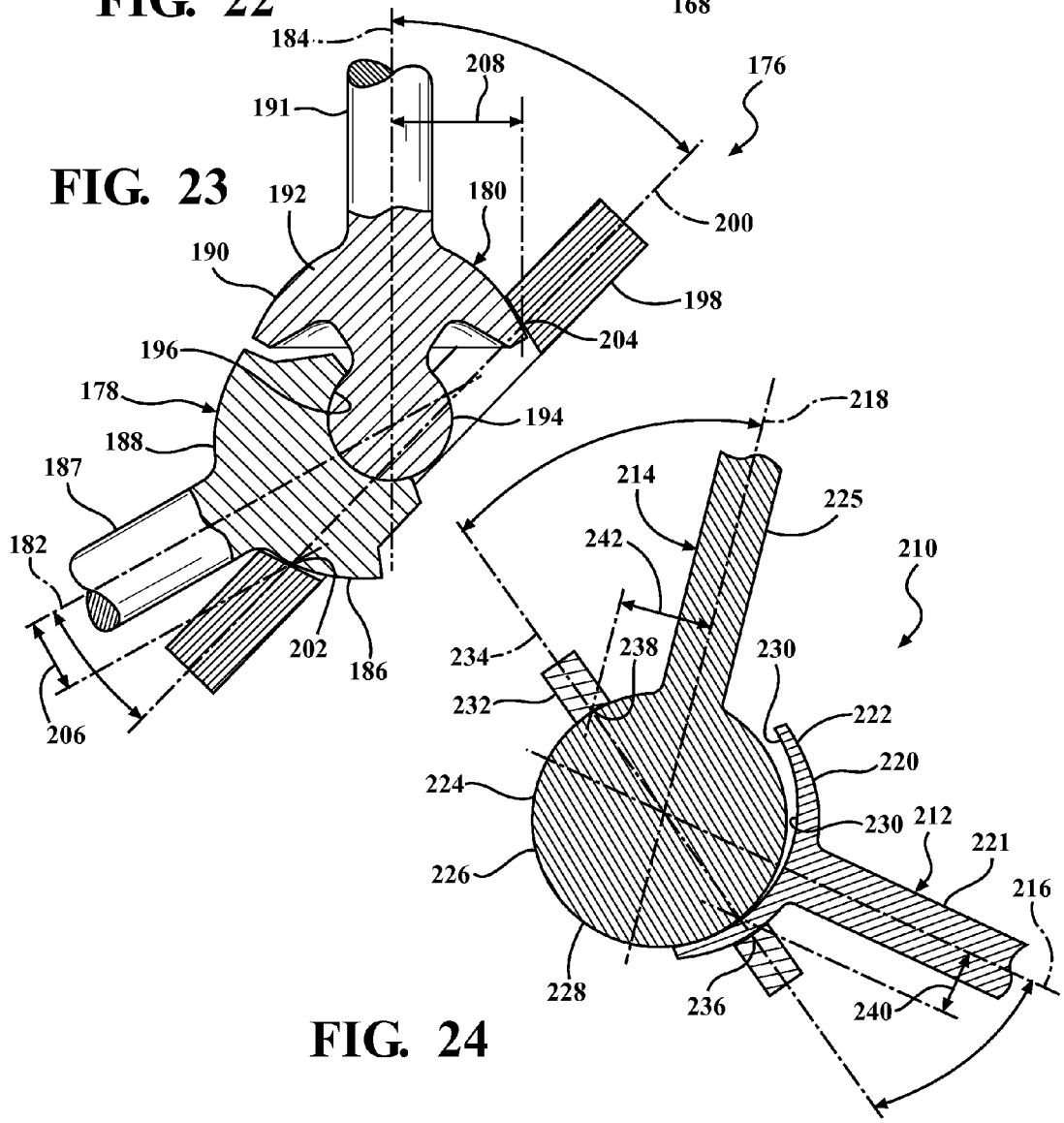
FIG. 23
FIG. 24

CONTINUOUSLY VARIABLE DRIVE MECHANISM

RELATED APPLICATIONS

This application claims the benefit of U.S. Provisional Ser. No. 61/757,373, filed on Jan. 28, 2013, U.S. Provisional Ser. No. 61/861,952, filed on Aug. 2, 2013, and U.S. Provisional Ser. No. 61/896,181, filed on Oct. 28, 2013, each of which is herein incorporated by reference in its entirety.

BACKGROUND and SUMMARY

A continuously variable transmission (CVT) is a type of transmission capable of providing more useable power, better fuel economy and a smoother driving experience than a traditional mechanical or automatic transmission. A typical automotive transmission may include a fixed number of gears from which to select. The transmission may employ a gearset that provides a given number of gear ratios. The transmission shifts gears in an attempt to provide the most appropriate gear ratio for a given situation. Switching into a particular gear may allow the vehicle to produce the maximum power it can with the least amount of energy.

A continuously variable transmission (CVT) is a transmission capable of changing seamlessly through an infinite number of effective gear ratios between maximum and minimum values. A CVT makes it possible to vary progressively the transmission ratio. This contrasts with other mechanical transmissions that offer a fixed number of gear ratios. A CVT may provide better fuel economy than other transmissions, by enabling the engine to run at its most efficient revolutions per minute (RPM) for a range of vehicle speeds. A CVT may also be used to maximize the performance of a vehicle by allowing the engine to turn at the RPM at which it produces peak power. This is typically higher than the RPM that achieves peak efficiency. A CVT may create a more fuel efficient vehicle. The nearly unlimited number of positions helps ensure it is always using the appropriate amount of power.

Disclosed herein is a continuously variable drive mechanism that includes an input member rotatable about an input axis of rotation. The input member includes a partial spheroid-shaped input traction surface. The drive mechanism further includes an output member rotatable about an output axis of rotation. The output member includes a partial spheroid-shaped output traction surface. A ring member overlays the input and output members. The ring member is rotatable in a rotational plane and includes a ring traction surface that engages the input traction surface of the input member and the output traction surface of the output member to rotatably couple the input member to the output member.

BRIEF DESCRIPTION OF THE DRAWINGS

The description herein makes reference to the accompanying drawings wherein like reference numerals refer to like parts throughout the several views, and wherein:

FIGS. 4A-D illustrate multiple alternately configured ring members that may be employed with the drive mechanism of FIG. 1;

FIG. 5 is a partial cross-sectional view of the exemplary drive mechanism of FIG. 1 taken along section line 5-5;

FIG. 6 is a schematic illustration of the exemplary drive mechanism of FIG. 1 illustrating the output member pivoted to a selected position for adjusting a speed ratio of the drive mechanism;

FIG. 10 is a schematic illustration of the exemplary drive mechanism of FIG. 8 illustrating the ring member pivoted to a selected position for adjusting the speed ratio of the drive mechanism;

FIG. 11 is a schematic illustration of an alternately configured exemplary continuously variable drive mechanism employing a pair of interconnected ring members for operably connecting the input member to the output member;

FIG. 12 is an end view of the drive mechanism of FIG. 11;

FIG. 22 is a schematic illustration of an alternately configured exemplary continuously variable drive mechanism employing stepped input and output members;

FIG. 23 is a schematic partial cross-sectional view of an alternately configured exemplary continuously variable drive mechanism employing an integrally formed pivot bearing;

FIG. 24 is a schematic partial cross-sectional view of an alternately configured exemplary continuously variable drive mechanism employing in integrally formed pivot bearing engaging the ring member;

DETAILED DESCRIPTION

Figure 1:
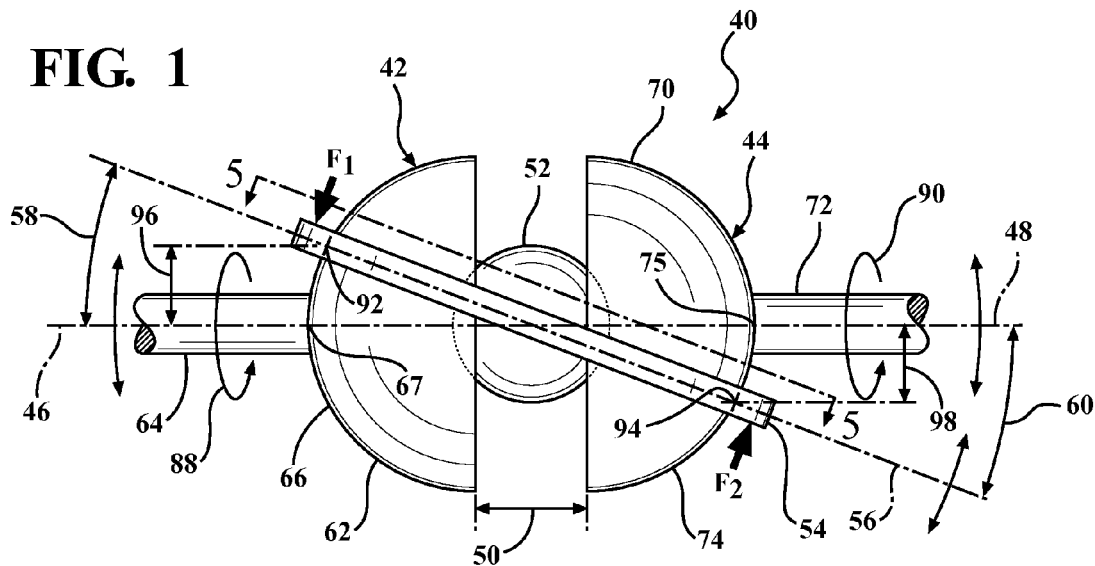
FIG. 1 is a schematic illustration of an exemplary continuously variable drive mechanism.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIGS. 1-5, an exemplary continuously variable drive mechanism 40 includes an input member 42 and an output member 44 positioned adjacent the input member. The input member 42 is rotatable about an input axis of rotation 46, and the output member 44 is rotatable about an output axis of rotation 48. A ring member 54 encircles the input and output members 42 and 44 and operates to rotatably couple the input member 42 to the output member 44. The ring member 54 may be rotated in a rotational plane 56. The drive mechanism 40 operates to transfer rotational torque from the input member 42 to the output member 44 through the ring member 54. A speed ratio of the drive mechanism 40 (e.g., speed ratio=(rotational speed of output member 44)÷ (rotational speed of input member 42)) may be varied by selectively adjusting an angular orientation 58 of the ring member rotational plane 56 relative to the input axis of rotation 46 and/or an angular orientation 60 of the ring member rotational plane 56 relative to the output axis of rotation 48.

Figure 3:
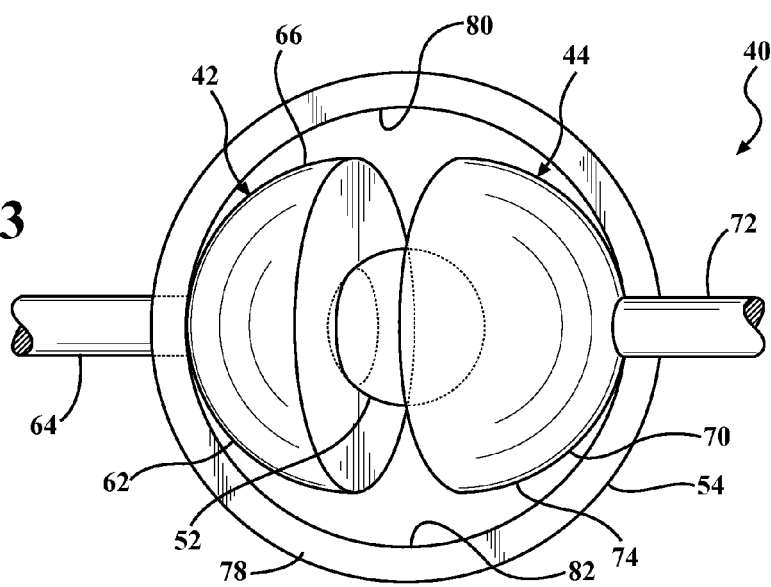
FIG. 3 is a schematic illustration of the drive mechanism of FIG. 1 viewed from a perspective perpendicular to a ring member operably connecting a rotatable input member to a rotatable output member.

Continuing to reference FIGS. 1, 3 and 5, the input member 42 may be spaced from the output member 44 by a spacing distance 50. A pivot bearing 52 may be disposed between the input member 42 and the output member 44. The pivot bearing 52 may slideably engage the input member 42 and the output member 44, and generally operates to maintain the input and output members 42 and 44 at the selected spacing distance 50.

Figure 2:
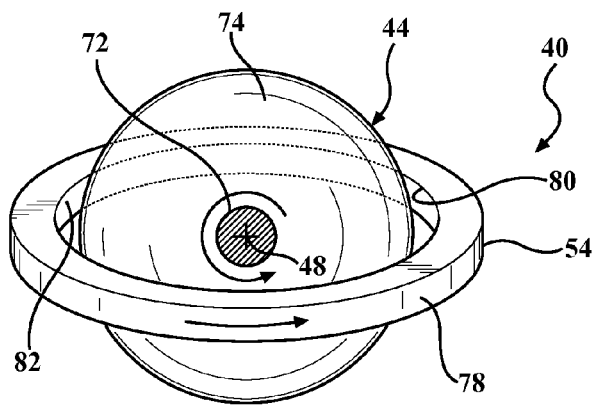
FIG. 2 is an end view of the drive mechanism of FIG. 1.

With reference to FIGS. 1-3, the input member 42 may include an input speed selector hub 62 attached to an input shaft 64. The input speed selector hub 62 may include an input traction surface 66 that engages the ring member 54. The input traction surface 66 has a generally convex shape when viewed from the input shaft 64 side of the input member 42. An extended portion of the surface contour of the input traction surface 66 intersects the input axis of rotation 46 at a first intersect 67. The surface contour of the input traction surface 66 may be varied to accommodate the design and performance requirements of a particular application. For example, the input traction surface 66 may be configured as a quadratic surface, such as an ellipsoid, spheroid, sphere, circular paraboloid, and circular cone, as well as other geometric shapes. The input traction surface 66 may also be configured as a compound surface consisting of multiple adjoining geometric shapes. For purposes of discussion, the input traction surface 66 is illustrated as having a generally spheroidal shape, but in practice, may also employ other contours. A sphere is considered a particular form of a spheroid in which the generating ellipse is a circle.

With particular reference to FIG. 5, the input member 42 may include a recessed input pivot bearing pocket 68 formed in the input speed selector hub 62 for slideably receiving pivot bearing 52. The input pivot bearing pocket 68 may be generally located along a side of the input speed selector hub 62 opposite the input shaft 64, and may be positioned such that a geometric center of the input pivot bearing pocket 68 substantially coincides with the input axis of rotation 46. The input pivot bearing pocket 68 may be sized and configured to accommodate a particular configuration of the pivot bearing 52 being employed. The input pivot bearing pocket 68 may be sized larger than the pivot bearing 52. The input pivot bearing pocket 68 may have any of a variety of geometric surface contours. For example, the illustrated input pivot bearing pocket 68 is shown to include a generally spherical shape, but may also employ other geometric shapes, such as a cone or polygonal shape. The precise size, shape and contour of the input pivot bearing pocket 68 may be determined in part by the design and performance requirements of a particular application, and may result from a balance between minimizing operational friction occurring between the input pivot bearing pocket 68 and the pivot bearing 52, and minimizing structural operating loads imposed on the bearing pocket 68 and the pivot bearing 52.

With reference to FIGS. 1-3, the output member 44 may be similarly configured as the input member 42. For example, the output member 44 may include an output speed selector hub 70 attached to an output shaft 72. The output speed selector hub 70 may include an output traction surface 74 that engages the ring member 54. The output traction surface 74 has a generally convex shape when viewed from the output shaft 72 side of the output member 44. An extended portion of the output traction surface 74 intersects the output axis of rotation 48 at a second intersect 75. The surface contour of the output traction surface 74 may be varied to accommodate the design and performance requirements of a particular application. For example, the output traction surface 74 may be configured as a quadratic surface, such as an ellipsoid, spheroid, sphere, circular paraboloid, and circular cone, as well as other geometric shapes. The output traction surface 74 may also be configured as a compound surface consisting of multiple adjoining geometric shapes. For purposes of discussion, the output traction surface 74 is illustrated as having a generally spheroidal shape, but may also employ other contours.

With particular reference to FIG. 5, the output member 44 may include a recessed output pivot bearing pocket 76 formed in the output speed selector hub 70 for slideably receiving the pivot bearing 52. The output pivot bearing pocket 76 may be generally located along a side of the output speed selector hub 70 opposite the output shaft 72, and may be positioned such that a geometric center of the output pivot bearing pocket 76 substantially coincides with the output axis of rotation 48. The output pivot bearing pocket 76 may be sized and configured to accommodate a particular configuration of the pivot bearing 52 being employed. The pivot bearing 52 may be sized larger or smaller than the output pivot bearing pocket 76. The output pivot bearing pocket 76 may have any of a variety of geometric surface contours. For example, the illustrated output pivot bearing pocket 76 is shown to have a generally spherical shape, but may also employ other geometric shapes, such as a cone or polygonal shape. The actual size, shape and contour of the output pivot bearing pocket 76 may be determined in part by the design and performance requirements of a particular application, and may result from a balance between minimizing operational friction occurring between the output pivot bearing pocket 76 and the pivot bearing 52, and minimizing structural operating loads imposed on the pivot bearing pocket 76 and the pivot bearing 52.

The exemplary input and output speed selector hubs 62 and 70 are illustrated as having substantially the same size and shape, but may alternatively have dissimilar configurations. For example, the input traction surface 66 of the input member 42 may include a different contour from the output traction surface 74 of the output member 44. Also, the input speed selector hub 62 may be sized larger or smaller than the output speed selector hub 70.

With reference to FIGS. 1, 3 and 5, the input member 42 and output member 44 are supported on the pivot bearing 52. The pivot bearing 52 may be used to establish the spacing distance 50 between the input member 42 and the output member 44. The pivot bearing 52 slideably engages the input pivot bearing pocket 68 and the output pivot bearing pocket 76. This enables the input member 42 to rotate about the input axis of rotation 46 at a different rotational speed than that at which the output member 44 rotates about the output axis or rotation 48. The configuration of the pivot bearing 52 also enables the input and output members 42 and 44 to pivot around the pivot bearing 52 to vary the angular orientation of the input and output members 42 and 44 relative to one another and the ring member 54 to adjust a speed ratio of the drive mechanism 40.

Figure 14:
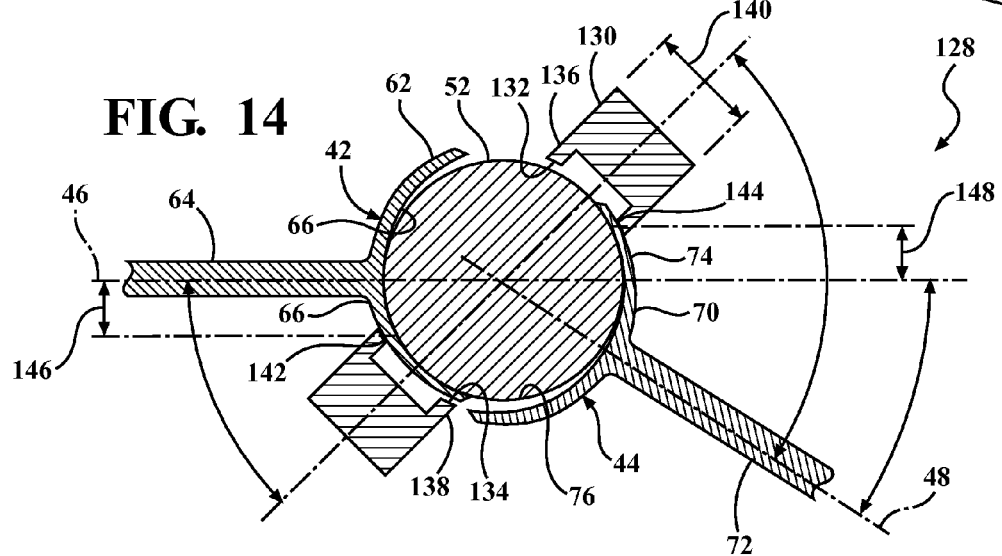
FIG. 14 is a schematic illustration of an alternately configured exemplary continuously variable drive mechanism employing a ring member having a pair of spaced contact surfaces for engaging the input member and the output member.

In practice, the size of the pivot bearing 52 and/or the input and output pivot bearing pockets 68 and 76 may be configured larger or smaller relative to the input and output members 42 and 44, illustrated, for example, in FIG. 14. The pivot bearing 52 may also have a different configuration, and may include, for example, a system of bearings for enabling relative motion between the input member 42, output member 44 and ring member 54.

With reference to FIGS. 1-5, the ring member 54 operably couples the input member 42 to the output member 44. The ring member may be configured as a generally circular ring having an outer circumferential edge 78, an inner edge 80 and a thickness "T". The inner edge 80 defines a ring traction surface 82 that engages the input traction surface 66 of the input member 42 and the output traction surface 74 of the output member 44. The thickness "T" of the ring member 54 may vary based at least in part on the design and performance requirements of a particular application. The ring traction surface 82 may include various contours, examples of which are illustrated in FIGS. 4A-D. For example, as illustrated in FIG. 4A, the ring traction surface 82 may have a generally concave curved contour that may approximate a contour of the input traction surface 66 and/or the output traction surface 74. The drive mechanism 40 may also employ an alternatively configured ring member 54' that includes a generally cylindrical-shaped ring traction surface 82', such as illustrated, for example, in FIG. 4B. With particular reference to FIG. 4C, an alternatively configured ring member 54" includes a tapered ring traction surface 82". In FIG. 4D, a ring traction surface 82''' may include a generally convex curved ring traction surface 82'''. It shall be understood that ring members 54, 54', 54" and 54''' are merely examples of a wide variety of ring traction surface contours that may be employed with the drive mechanism 40, and that other contours may also be utilized to accommodate a particular application.

With continued reference to FIGS. 1-5, the ring member 54 is generally free to rotate along the rotational plane 56 to transfer rotational torque from input member 42 to the output member 44. The ring member 54 may be supported in a housing or fixture suitably configured to enable the ring member 54 to rotate in its rotational plane 56. An angular orientation of the ring member rotational plane 56 may be maintained in a fixed position relative to the input axis of rotation 46 and/or output axis rotation 48, or selectively varied. Various actuators may be employed for controlling the angular orientation of the ring member 54 relative to the input and output members 42 and 44.

With particular reference to FIGS. 1, 3 and 5, the ring member 54 encircles the input speed selector hub 62 and the output speed selector hub 70, with the ring traction surface 82 engaging the input traction surface 66 at an input contact location 92 and the output traction surface 74 at an output contact location 94. Ring member actuating forces $F_1$ and $F_2$ (see for example FIG. 1) may be applied to the ring member 54 for engaging and maintaining the ring member 54 in contact with the input traction surface 66 and output traction surface 74. A maximum torque that may be effectively transferred between the input member 42 and the output member 44 through the ring member 54 is generally a function of the traction forces occurring between the ring member 54 and the input and output speed selector hubs 62 and 70. The traction forces are reactive forces generated through engagement of the ring member 54 with the input speed selector hub 62 and the output speed selector hub 70, and are a function of the magnitude of ring member actuating forces $F_1$ and $F_2$ tending to push the ring member 54 into engagement with the input and output speed selector hubs 62 and 70. Generally speaking, increasing the magnitude of the ring member actuating forces $F_1$ and $F_2$ tends to increase the maximum torque that may be transferred between the input member 42 and the output member 44. Conversely, decreasing the magnitude of the ring member actuating forces $F_1$ and $F_2$ tends to decrease the maximum torque that may be transferred between the input member 42 and the output member 44.

The magnitude of the traction forces occurring between the ring member 54 and the input member 42 and the output member 44 may be affected by the stiffness of the ring member 54. For example, constructing the ring member 54 from an elastic material may enable the ring member 54 to elastically deform as it travels along the input and output traction surfaces 66 and 74. This may allow the ring member 54 to more closely conform to the shape of the input and output traction surfaces 66 and 74, thereby potentially increasing the magnitude of the traction forces.

With continued reference to FIGS. 1-5, the drive mechanism 40 operates to transfer rotational torque from input member 42 to output member 44 through ring member 54. Rotational torque applied to input shaft 64 may be transferred through input speed selector hub 62 to the ring member 54, thereby causing the ring member 54 to rotate within its rotational plane 56. The energy transmitted by the ring member 54 may be transferred to output speed selector hub 70 and output as a rotational torque at output shaft 72.

With particular reference to FIG. 1, the ring member 54 may be arranged in various positions relative to the input member 42 and output member 44. For example, the ring member 54 may be positioned generally crosswise relative to the input and output axis of rotation 46 and 48, such that diametrically opposite sides of the ring member 54 are arranged on opposite sides of the input axis of rotation 46 and the output axis of rotation 48, such as illustrated, for example, in FIG. 1. With the ring member 54 positioned in this manner, the rotational plane 56 of the ring member is located between the first intersect 67 and the second intersect 75. This arrangement causes the input member 42 and output member 44 to rotate in the same direction, as illustrated, for example, by directional arrows 88 and 90 in FIG. 1. In practice, the input member 42 and output member 44 may also rotate in a direction opposite to what is illustrated in FIG. 1.

Figure 7:
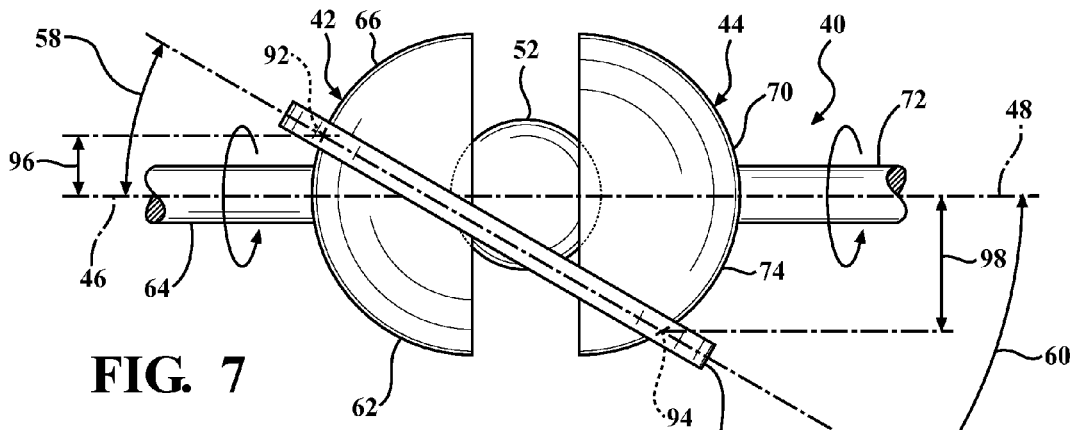
FIG. 7 is a schematic illustration of the exemplary drive mechanism of FIG. 1 illustrating the ring member pivoted to a selected position for adjusting the speed ratio of the drive mechanism.

The drive mechanism 40 includes features that enable the input member 42 to operably rotate at substantially the rotational speed (i.e., revolutions/minute (RPM)) as the output member 44, or at a different rotational speed. With particular reference to FIGS. 1, 6 and 7, the speed ratio of the drive mechanism 40 may be selectively varied by adjusting the location at which the ring member 54 contacts the input speed selector hub 62 and the output speed selector hub 70. For purposes of discussion, the speed ratio of the drive mechanism 40 corresponds to the rotational speed (i.e., revolutions per minute (RPM)) of the output shaft 72 divided by a rotational speed ((i.e., revolutions per minute (RPM)) of the input shaft 64. Operating the drive mechanism 40 at a speed ratio of 1.0 result in the input and output members 42 and 44 rotating at substantially the same speed. Operating the drive mechanism 40 at a speed ratio greater than 1.0 result in the output shaft 72 rotating at a higher speed than the input shaft 64. Operating the drive mechanism 40 at a speed ratio less than 1.0 result in the output shaft 72 rotating at a lower speed than the input shaft 64.

With particular reference to FIGS. 1, 6 and 7, the speed ratio of the drive mechanism 40 may be selectively varied by adjusting a position of the input contact location 92 at which the ring member 54 engages the input traction surface 66 of the input speed selector hub 62, and a position of the output contact location 94 at which the ring member 54 engages the output traction surface 74 of the output speed selector hub 70. Generally speaking, the speed ratio is directly proportional to a ratio of an input radial distance 96 between the input contact location 92 and the input axis of rotation 46 and an output radial distance 98 between the output contact location 94 and the output axis of rotation 48. In practice, however, the speed ratio may also be affected by other factors, such as slipping that may occur between the ring member 54 and the input and output speed selector hubs 62 and 70. Setting the input radial distance 96 substantially equal to output radial distance 98 will cause the drive mechanism 40 to operate at substantially a 1.0 speed ratio. Setting the input radial distance 96 larger than the output radial distance 98 will result in the drive mechanism 40 operating at a speed ratio greater than 1.0, and setting the input radial distance 96 smaller than the output radial distance 98 will produce a speed ratio less than 1.0. One or both of the input radial distance 96 and the output radial distance 98 may be modified to change to the speed ratio.

With particular reference to FIGS. 1 and 6, the output radial distance 98 between the output contact location 94 and the output axis of rotation 48, and thus the speed ratio of drive mechanism 40, may be selectively changed by pivoting the output member 44 around the pivot bearing 52, as illustrated for example in FIG. 6. Pivoting the output member 44 counter-clockwise (when viewed from the perspective of FIG. 6) increases the output radial distance 98 between the output contact location 94 and the output axis of rotation 48, thereby decreasing the rotational speed of the output member 44 relative to the input member 42. Conversely, pivoting the output member 44 clockwise (when viewed from the perspective of FIG. 6) decreases the output radial distance 98 between the output contact location 94 and the output axis of rotation 48, thereby increasing the rotational speed of the output member 44 relative to the input member 42. Positioning the ring member 54 opposite to that which is shown in FIGS. 1, 6 and 7, wherein the right side of the ring member 54 (as viewed from the perspective of FIGS. 1 and 6) is positioned above the output shaft 72 and the left side of the ring member 54 is positioned below the input shaft 64, will have an opposite effect. With this arrangement, rotating the output member 44 counter-clockwise will increase the rotational speed of the output member 44 relative to input member 42 and rotating the output member 54 clockwise will decrease the rotational speed of the output member 44 relative to input member 42.

The rotational speed of the output member 44 relative to the input member 42 may alternatively be adjusted by pivoting the input member 42 around the pivot bearing 52, in a similar manner as previously described with respect to output member 44. For example, with the ring member 54 arranged relative to input member 42 and output member 44, as illustrated, for example, in FIGS. 1 and 6, pivoting the input member 42 counter-clockwise (when viewed from the perspective of FIGS. 1 and 6), increases the input radial distance 96 between the input contact location 92 and the input axis of rotation 46, thereby increasing the rotational speed of the output member 44 relative to the input member 42. Conversely, pivoting the input member 42 clockwise (when viewed from the perspective of FIGS. 1 and 6) decreases the input radial distance 96 between the input contact location 92 and the input axis of rotation 46, thereby decreasing the rotational speed of the output member 44 relative to the input member 42. Positioning the ring member 54 opposite to that which is shown in FIGS. 1 and 6, wherein the right side of the ring member 54 (as viewed from the perspective of FIGS. 1 and 6) is positioned above the output shaft 72 and the left side of the ring member 54 positioned below the input shaft 64, will have an opposite effect. With this arrangement, rotating the input member 42 counter-clockwise will decrease the rotational speed of the output member 44 relative to input member 42 and rotating the output member 54 clockwise will increase the rotational speed of the output member 44 relative to input member 42. The speed ratio of the drive mechanism 30 may be adjusted by pivoting one or both of the input member 42 and output member 44 around the pivot bearing 52.

With reference to FIGS. 1 and 7, the speed ratio of the drive mechanism 40 may also be selectively modified by adjusting the angular orientation of the ring member 54 relative to the input axis of rotation 46 and output axis of rotation 48. Adjusting the angular orientation of the ring member 54 may change the location at which the ring member 54 contacts the input traction surface 66 of the input speed selector hub 62 and the output traction surface 74 of the output speed selector hub 70. For example, in the exemplary configuration illustrated in FIG. 1, the ring member 54 is shown oriented at an angular orientation 58 relative to the input axis of rotation 46 and at an angular orientation 60 relative to the output axis of rotation 48 that is substantially equal to angular orientation 58. This particular arrangement results in the input radial distance 96 between input contact location 92 and input axis of rotation 46 being substantially equal to the output radial distance 98 between output contact location 94 and the output axis of rotation 48, which results in the drive mechanism 40 operating at substantially a 1.0 speed ratio.

Changing the angular orientation of the ring member 54 relative to the input axis of rotation 46 and output axis of rotation 48 may result in a corresponding change in the speed ratio of the drive mechanism 40. For example, FIG. 7 illustrates the ring member 54 pivoted clockwise (as viewed from the perspective of FIG. 7) from the position illustrated in FIG. 1 about the input contact location 92. This results in an increase in the output radial distance 98, while the input radial distance 92 remains substantially unchanged, which in turn causes a corresponding decrease in the rotational speed of output member 44 relative to input member 42. This is just one example of how the speed ratio of the drive mechanism 40 may be affected by changes in the angular orientation of the ring member 54 relative to the input axis of rotation 46 and the output axis of rotation 48. Other angular orientations may also be employed to effect changes in the speed ratio of the drive mechanism 40. It is not necessary that one of the input radial distance 96 and the output radial distance 98 remain substantially constant when changing the angular orientation of the ring member 54, and both distances may be adjusted concurrently or independent of one another. Adjusting the angular orientation of the ring member 54 may also be used in combination with the previously described options of pivoting one or both of the input member 42 and the output member 44 about the pivot bearing 52 as a way of adjusting the speed ratio of drive mechanism 40.

The ability to adjust the speed ratio of drive mechanism 40 by pivoting one or both of the input member 42 and output member 44 around the pivot bearing 52, and/or changing the angular orientation of the ring member 54 relative to the input axis of rotation 46 and the output axis of rotation 48, or any combination thereof, allows substantial flexibility in configuring the drive mechanism 40 for a particular application. For example, it may be desirable to maintain a constant angular orientation between the input axis of rotation 46 and the output axis of rotation 48. In that instance, the angular orientation of the ring member 54 may be adjusted to vary the speed ratio of the drive mechanism 40, thereby avoiding having to vary the angular orientation between the input axis of rotation 46 and the output axis of rotation 48. Other alternative configurations may allow for adjusting the speed ratio of the drive mechanism 40 by rotating any combination of one or both of the input and output members 46 and 48 around the pivot bearing 52, or by changing the angular orientation of the ring member 54, either independently or in combination with pivoting one or both of the input and output members 42 and 44 around the pivot bearing 52.

Figure 8:
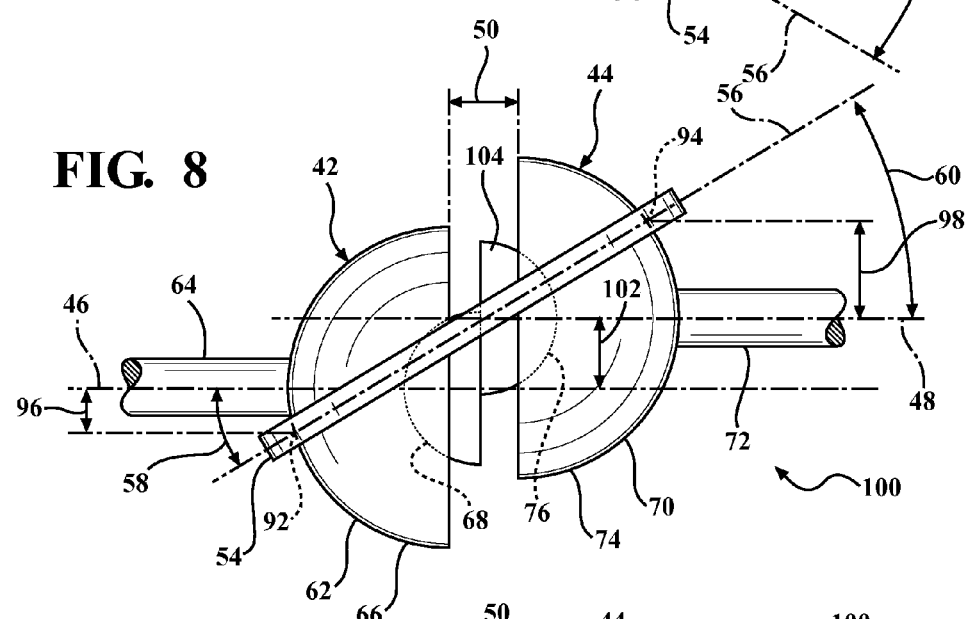
FIG. 8 is a schematic illustration of an alternately configured exemplary continuously variable drive mechanism.
Figure 9:
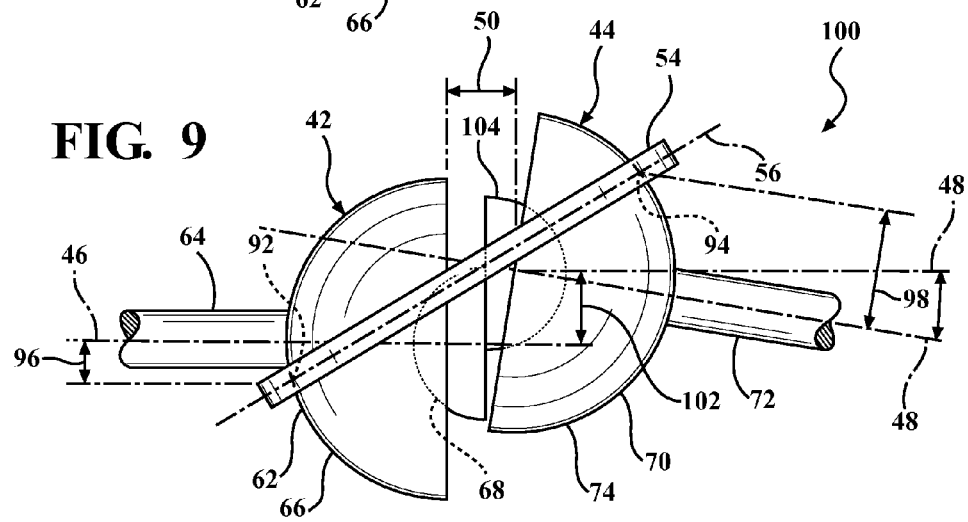
FIG. 9 is a schematic illustration of the exemplary drive mechanism of FIG. 8 illustrating the output member pivoted to a selected position for adjusting a speed ratio of the drive mechanism.

With reference to FIGS. 8-10, an alternatively configured continuously variable drive mechanism 100 may have the input axis of rotation 46 offset from the output axis of rotation 48. In the exemplary configuration of the drive mechanism 40 illustrated in FIG. 1, the input axis of rotation 46 and the output axis of rotation 48 are illustrated substantially coaxially aligned. Alternatively, the input axis of rotation 46 may be offset from the output axis of rotation 48 by an offset distance 102, as illustrated, for example, in FIG. 8. The drive mechanism 100 is otherwise similarly configured, and operates similarly, as drive mechanism 40. For example, drive mechanism 100 may include the input member 42 and the output member 44 positioned adjacent the input member 42. The input member 42 is rotatable about its input axis of rotation 46 and the output member 44 is rotatable about its output axis of rotation 48. The ring member 54 encircles the input and output members 42 and 44, and operates to rotatably couple the input member 42 to the output member 44. The ring member 54 is rotatable in the rotational plane 56. The drive mechanism 100 operates to transfer rotational torque from the input member 42 to the output member 44 through the ring member 54.

Continuing to reference FIG. 8, the input member 42 may be spaced from the output member 44 by the spacing distance 50. A pivot bearing 104 may be disposed between the input member 42 and the output member 44. The pivot bearing 104 may slideably engage the input member 42 and the output member 44, and generally operates to maintain the input and output members 42 and 44 at the selected spacing distance 50 and offset distance 102. The input member 42 may include the recessed input pivot bearing pocket 68 formed in the input speed selector hub 62 for slideably receiving the pivot bearing 104. The input pivot bearing pocket 68 may be positioned such that a geometric center of the input pivot bearing pocket 68 substantially coincides with the input axis of rotation 46. The output member 44 may include the recessed output pivot bearing pocket 76 formed in the output speed selector hub 70 for slideably receiving the pivot bearing 104. The output pivot bearing pocket 76 may be positioned such that a geometric center of the output pivot bearing pocket 76 substantially coincides with the output axis of rotation 48.

The input member 42 and output member 44 are supported on the pivot bearing 104. The pivot bearing 104 may be used to establish the spacing distance 50 between the input member 42 and the output member 44, and the offset spacing 102 between the input axis of rotation 46 and the output axis of rotation 48. The pivot bearing 104 slideably engages the input pivot bearing pocket 68 and the output pivot bearing pocket 76. This enables the input member 42 to rotate about the input axis of rotation 46 at a different rotational speed than that at which the output member 44 rotates about the output axis or rotation 48. The configuration of the pivot bearing 104 also enables the input and output members 42 and 44 to pivot around the pivot bearing 104 to vary the angular orientation of the input and output members 42 and 44 relative to one another and the ring member 54 to adjust the speed ratio of the drive mechanism 100. FIGS. 8-10 illustrate one exemplary configuration of the pivot bearing 104 that may be employed with the drive mechanism 100. In practice, the pivot bearing 104 may have a different configuration, which may include, for example, a system of bearings for enabling relative motion between the input member 42, output member 44 and ring member 54.

Similar to drive mechanism 40 (as illustrated, for example, in FIGS. 1-7), the speed ratio of the drive mechanism 100 may be selectively varied by adjusting the input contact location 92 at which the ring member 54 engages the input traction surface 66 of the input speed selector hub 62, and the output contact location 94 at which the ring member 54 engages the output traction surface 74 of the output speed selector hub 70. The output radial distance 98 between the input contact location 94 and the output axis of rotation 48, and thus the speed ratio of drive mechanism 40, may be selectively changed by pivoting the output member 44 around the pivot bearing 104, as illustrated, for example in FIG. 9. Pivoting the output member 44 clockwise (when viewed from the perspective of FIG. 9) increases the output radial distance 98 between the output contact location 94 and the output axis of rotation 48, thereby decreasing the rotational speed of the output member 48 relative to the input member 42. Conversely, pivoting the output member 44 counter-clockwise (when viewed from the perspective of FIG. 9) decreases the output radial distance 98 between the output contact location 94 and the output axis of rotation 48, thereby increasing the rotational speed of the output member 44 relative to the input member 42.

The rotational speed of output member 44 relative to input member 42 may alternatively be adjusted by pivoting the input member 42 around the pivot bearing 104, in a similar manner as previously described with respect to output member 44. Pivoting the input member 42 clockwise (when viewed from the perspective of FIG. 9), increases the input radial distance 96 between the input contact location 92 and the input axis of rotation 46, thereby increasing the rotational speed of the output member 44 relative to the input member 42. Conversely, pivoting the input member 42 counter-clockwise (when viewed from the perspective of FIG. 9) decreases the input radial distance 96 between the input contact location 92 and the input axis of rotation 46, thereby decreasing the rotational speed of the output member 44 relative to the input member 42. The speed ratio of the drive mechanism 100 may be adjusted by pivoting one or both of the input member 42 and output member 44 around the pivot bearing 104.

With reference to FIGS. 8 and 10, the speed ratio of the drive mechanism 100 may also be adjusted by selectively modifying the angular orientation of the ring member 54 relative to the input axis of rotation 46 and output axis of rotation 48. For example, in the exemplary configuration illustrated in FIG. 8, the ring member 54 is shown oriented at the angular orientation 58 relative to the input axis of rotation 46, and at the angular orientation 60 relative to the output axis of rotation 48 that is substantially equal to the angular orientation 60. This particular arrangement results in the input radial distance 96 between the input contact location 92 and the input axis of rotation 46 being substantially equal to the output radial distance 98 between the output contact location 94 and the output axis of rotation 48, which results in the drive mechanism 100 operating at substantially a 1.0 speed ratio.

Changing the angular orientation of the ring member 54 relative to the input axis of rotation 46 and the output axis of rotation 48 may result in a corresponding change in the speed ratio of the drive mechanism 100. For example, in FIG. 10 the ring member 54 is illustrated pivoted counter-clockwise (as viewed from the perspective of FIG. 10), relative to its position, as illustrated in FIG. 8, about the input contact location 92, which results in an increase in the output radial distance 98 while the input radial distance 96 remains substantially unchanged. This causes a corresponding decrease in the rotational speed of output member 44 relative to input member 42. This is merely one example of how the speed ratio of the drive mechanism 100 may be affected by changes in the angular orientation of the ring member 54 relative in the input axis of rotation 46 and output axis of rotation 48. Other angular orientations may also be employed to effect changes in the speed ratio of drive mechanism 100. It is not necessary that one of the input radial distance 96 and the output radial distance 98 remain substantially constant when changing the angular orientation of the ring member 54, and both distances may be adjusted. Adjusting the angular orientation of the ring member 54 may also be used in combination with the previously described option of pivoting one or both of the input member 42 and output member 44 about the pivot bearing 104 to adjust the speed ratio of drive mechanism 100.

Figure 13:
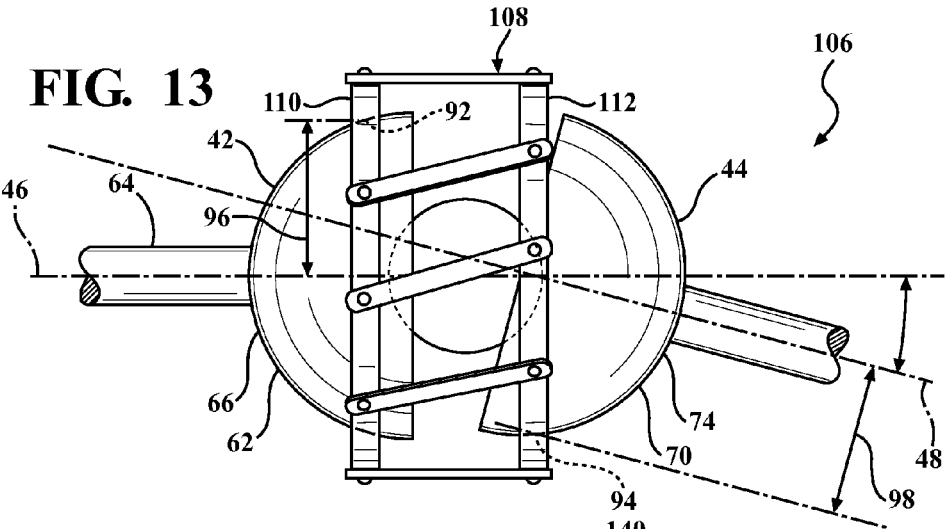
FIG. 13 is a schematic illustration of the exemplary drive mechanism of FIG. 11 illustrating the output member pivoted to a selected position for adjusting the speed ratio of the drive mechanism.

With reference to FIGS. 11-13, an alternatively configured exemplary continuously variable drive mechanism 106 may include a self-adjusting ring mechanism 108 that may alternately be used in place of the ring member 54 of the drive mechanism 40 (see FIG. 1). Aside from the self-adjusting ring mechanism 108, the drive mechanism 106 is similarly configured, and operates similarly, as drive mechanism 40. For example, the drive mechanism 108 may include the input member 42 and the output member 44 positioned adjacent the input member 42. The input member 42 may be rotated about the input axis of rotation 46, and the output member 44 may be rotated about the output axis of rotation 48. The self-adjusting ring mechanism 108 encircles the input and output members 42 and 44 and operates to rotatably couple the input member 42 to the output member 44. The drive mechanism 106 operates to transfer rotational torque from the input member 42 to the output member 44 through the self-adjusting ring mechanism 108.

Continuing to reference FIG. 11, the input member 42 may be spaced from the output member 44 by the spacing distance 50. The pivot bearing 52 may be disposed between the input member 42 and the output member 44. The pivot bearing 52 slideably engages the input member 42 and the output member 44, and generally operates to maintain the input and output members 42 and 44 at the selected spacing distance 50.

The input member 42 may include the input speed selector hub 62 attached to the input shaft 64. The input speed selector hub 62 may include the input traction surface 66 that engages the self-adjusting ring mechanism 108. The input member 42 may include the recessed input pivot bearing pocket 68 formed in the input speed selector hub 62 for slideably receiving the pivot bearing 52.

The output member 44 may include the output speed selector hub 70 attached to the output shaft 72. The output speed selector hub 70 may include the output traction surface 74 that engages the self-adjusting ring mechanism 108. The output member 44 may include the recessed output pivot bearing pocket 76 formed in the output speed selector hub 70 for slideably receiving the pivot bearing 52.

With continued reference to FIG. 11, the input member 42 and the output member 44 may be supported on the pivot bearing 52. The pivot bearing 52 slideably engages the input pivot bearing pocket 68 and the output pivot bearing pocket 76. This enables the input member 42 to rotate about the input axis of rotation 46 at a different rotational speed than that at which the output member 44 rotates about the output axis or rotation 48. The pivot bearing 52 also enables the input and output members 42 and 44 to pivot around the pivot bearing 52 to vary the angular orientation of the input and output members 42 and 44 relative to one another and the self-adjusting ring mechanism 108 to adjust the speed ratio of the drive mechanism 106.

With reference to FIGS. 11 and 12, the self-adjusting ring mechanism 108 operably couples the input member 42 to the output member 44. The self-adjusting ring mechanism 108 may include an input ring member 110 that operably engages the input traction surface 66 of the input speed selector hub 62, and an output ring member 112 that operably engages the output traction surface 74 of the output speed selector hub 70. One or more actuating links 114 connect the input ring member 110 to the output ring member 112. The actuating links 114 may be pivotally connected to the input ring member 110 and the output ring member 112 using a fastener 116. The actuating links 114 may be arranged at an oblique angle 115 relative to a rotational plane of the input ring member 110 and/or the output ring member 112.

The input ring member 110 and output ring member 112 may each be similarly configured as ring member 54 of drive mechanism 40 (see FIG. 1). The output ring member 112 may have the same configuration as the input ring member 110, but may be oriented within the drive mechanism 106 as a mirror opposite of output ring member 110. The input ring member 110 and the output ring member 112 may each include a generally ring-shaped configuration having an outer circumferential edge 118 an inner edge 120. The inner edge 120 of the input ring member 110 defines a ring traction surface 122 that engages the input traction surface 66 of the input member 42, and the inner edge 120 of the output ring member 112 includes the ring traction surface 122 that engages the output traction surface 74 of the output member 44. The ring traction surface 122 may include various contours, examples of which are illustrated in FIGS. 4A-D.

With continued reference to FIGS. 11-13, the drive mechanism 106 operates to transfer rotational torque from the input member 42 to the output member 44 through the self-adjusting ring mechanism 108. Rotational torque applied to the input shaft 64 may be transferred through input speed selector hub 62 to the self-adjusting ring mechanism 108 and onto the output speed selector hub 70, where it is output as a rotational torque through output shaft 72.

The self-adjusting ring mechanism 108 operates to control the traction forces occurring between the input ring member 110 and the input traction surface 66 of the input speed selector hub 62, and the traction forces occurring between the output ring member 112 and the output traction surface 74 of the output speed selector hub 70. For example, applying a clockwise rotational torque (as viewed from the input shaft 64 side of the input member 42) to the input member 42 produces a reaction force in the input ring member 110 that is resisted by an opposing reaction force exerted on the output ring member 112 by the output member 44. The opposing reaction forces tend to urge the input ring member 110 and the output ring member 112 to rotate in opposite directions, as indicated by the respective directional arrows 124 and 126, as shown in FIG. 11. This in turn causes the actuating links 114 to pivot about their respective fasteners 116, which in turn urges the input ring member 110 and output ring member 112 toward one another, thereby increasing the traction forces occurring between the input and output ring members 110 and 112 and the respective input and output speed selector hubs 62 and 70. The ability to automatically adjust the traction forces occurring between the ring members 110 and 112 and the input and output members 42 and 44 enables the drive mechanism 106 to accommodate fluctuations in the torque transferred between input shaft 64 and output shaft 72.

With particular reference to FIGS. 11 and 13 the speed ratio of the drive mechanism 106 may be selectively varied by adjusting the location at which the self-adjusting ring mechanism 108 contacts the input speed selector hub 62 and the output speed selector hub 70. This may be accomplished, for example, by pivoting the output member 44 around the pivot bearing 52, as illustrated for example in FIG. 13. Pivoting the output member 44 counter-clockwise (when viewed from the perspective of FIGS. 11 and 13) decreases the rotational speed of the output member 48 relative to the input member 42. Conversely, pivoting the output member 44 clockwise (when viewed from the perspective of FIGS. 11 and 13) increases the rotational speed of the output member 44 relative to the input member 42.

The speed ratio of drive mechanism 106 may alternatively be adjusted by pivoting the input member 42 around the pivot bearing 52, similar to as previously described with respect to output member 44. For example, pivoting the input member 42 counter-clockwise (when viewed from the perspective of FIGS. 11 and 13) increases the rotational speed of the output member 44 relative to the input member 42. Conversely, pivoting the input member 42 clockwise (when viewed from the perspective of FIGS. 11 and 13) decreases the rotational speed of the output member 44 relative to the input member 42.

With reference to FIG. 14, an alternately configured continuously variable drive mechanism 128 may include a ring member 130 having a ring member input traction surface 132 spaced from a ring member output traction surface 134. The drive mechanism 128 may be similarly configured, and operate similarly, as drive mechanism 40 (see FIG. 1), but may employ the ring member 130 in place of the ring member 54. For example, the drive mechanism 128 may include the input member 42 and the output member 44 positioned adjacent the input member. The input member 42 is rotatable about the input axis of rotation 46, and the output member 44 is rotatable about the output axis of rotation 48. The ring member 130 encircles the input and output members 42 and 44 and operates to rotatably couple the input member 42 to the output member 44. The drive mechanism 128 operates to transfer rotational torque from the input member 42 to the output member 44 through the ring member 130.

The input member 42 may be spaced from the output member 44 by the pivot bearing 52 disposed between the input member 42 and the output member 44. The pivot bearing 52 may slideably engage the input member 42 and the output member 44, and generally maintains a selected spacing between the input and output members 42 and 44.

The input member 42 may include the input speed selector hub 62 attached to the input shaft 64. The input speed selector hub 62 may include the input traction surface 66 that engages the ring member input traction surface 132 of the ring member 130. The input member 42 may include the recessed input pivot bearing pocket 68 formed in the input speed selector hub 62 for slideably receiving the pivot bearing 52.

The output member 44 may include the output speed selector hub 70 attached to the output shaft 72. The output speed selector hub 70 may include the output traction surface 74 that engages the ring member output traction surface 134 of the ring member 130. The output member 44 may include the recessed output pivot bearing pocket 76 formed in the output speed selector hub 70 for slideably receiving the pivot bearing 52.

With continued reference to FIG. 14, the input member 42 and output member 44 may be supported on the pivot bearing 52. The pivot bearing 52 slideably engages the input pivot bearing pocket 68 and the output pivot bearing pocket 76. This enables the input member 42 to rotate about the input axis of rotation 46 at a different rotational speed than that at which the output member 44 rotates about the output axis or rotation 48. The pivot bearing 52 also enables the input and output members 42 and 44 to pivot around the pivot bearing 52 to vary the angular orientation of the input and output members 42 and 44 relative to one another and the ring member 130 to adjust the speed ratio of the drive mechanism 128.

The ring member 130 may include a pair of inwardly extending flanges that include an input flange 136 and an output flange 138. The ring member input traction surface 132 defines an inner circumferential edge of the input flange 136, and the ring member output traction surface 134 defines an inner circumferential edge of the output flange 138. The input flange 136 may be spaced a distance 140 from the output flange 138. The ring member input traction surface 132 operably engages the input traction 66 of the input speed selector hub 62, but is separated from the output traction surface 74 of the output speed selector hub 70. Similarly, the ring member output traction surface 134 operably engages the output traction surface 74 of the output speed selector hub 70, but is separated from the input traction surface 66 of the input speed selector hub 62. The input ring traction surface 132 and the output ring traction surface 134 may include various contours, examples of which are illustrated in FIGS. 4A-D.

With continued reference to FIG. 14, the drive mechanism 128 operates to transfer rotational torque from the input member 42 to the output member 44 through the ring member 130. Rotational torque applied to the input shaft 64 may be transferred through input speed selector hub 62 to the ring member 130 and onto the output speed selector hub 70, where it is output as a rotational torque through output shaft 72.

The speed ratio of the drive mechanism 128 may be selectively varied by adjusting an input contact location 142 at which the input ring member traction surface 132 of the ring member 130 engages the input traction surface 66 of the input speed selector hub 62, and an output contact location 144 at which the ring member output traction surface 134 of the ring member 130 engages the output traction surface 74 of the output speed selector hub 70. This may be accomplished, for example, by pivoting the output member 44 around the pivot bearing 52 relative to the ring member 130, as illustrated, for example, in FIG. 14. Pivoting the output member 44 counter-clockwise (when viewed from the perspective of FIG. 14) decreases the output radial distance 148, which in turn increases the rotational speed of the output member 44 relative to the input member 42. Conversely, pivoting the output member 44 clockwise (when viewed from the perspective of FIG. 14) increases the output radial distance 148, which in turn decreases the rotational speed of the output member 44 relative to the input member 42.

The speed ratio of drive mechanism 128 may alternatively be adjusted by pivoting the input member 42 around the pivot bearing 52, similar as previously described with respect to output member 44. For example, pivoting the input member 42 counter-clockwise (when viewed from the perspective of FIG. 14) decreases the input radial distance 146, which in turn decreases the rotational speed of the output member 44 relative to the input member 42. Conversely, pivoting the input member 42 clockwise (when viewed from the perspective of FIG. 14) increases the input radial distance 146, which in turn increases the rotational speed of the output member 44 relative to the input member 42. One or both of the input radial distance 146 and the output radial distance 148 may be modified to adjust the speed ratio of the drive mechanism 128.

With reference to FIGS. 15-18, an exemplary continuously variable drive mechanism 150 may be similarly configured as drive mechanism 40, but with the ring member 54 arranged relative to the input member 42 and output member 44 such that the first intersect 67 (i.e., the location at which the input axis of rotation 46 intersects the extended surface contour of the input traction surface 66) and the second intersect 75 (i.e., the location at which the output axis of rotation 48 intersects the extended surface contour of the output traction surface 74) are both located on the same side of the rotational plane 56 of the ring member 54. This arrangement causes the input member 42 to rotate in the opposite direction of the output member 44. In contrast, arranging the ring member 54 generally crosswise, for example, as in drive mechanism 40 (see FIG. 1), causes the input member 42 and output member 44 to rotate in the same direction. The drive mechanism 150 is otherwise similarly configured, and operates similarly, as drive mechanism 40.

Figure 15:
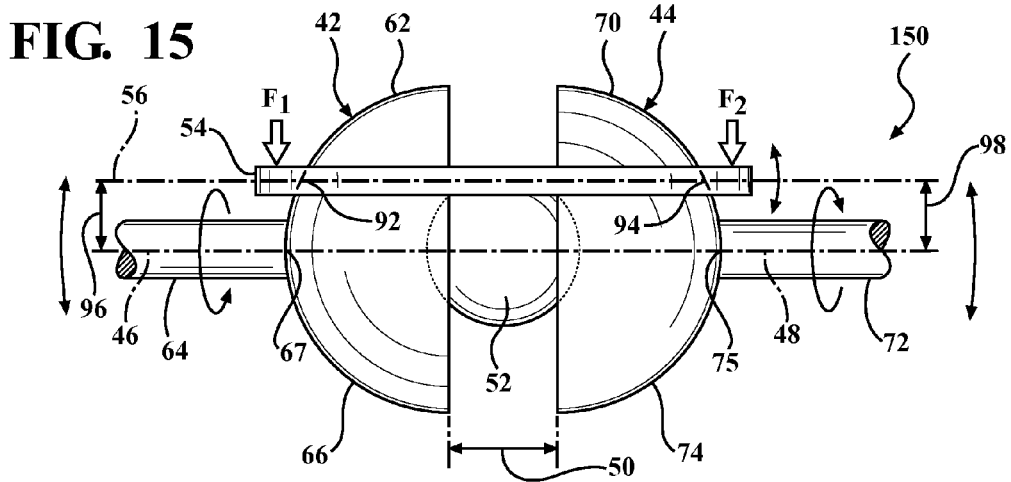
FIG. 15 is a schematic illustration of an alternately configured exemplary continuously variable drive mechanism.
Figure 16:
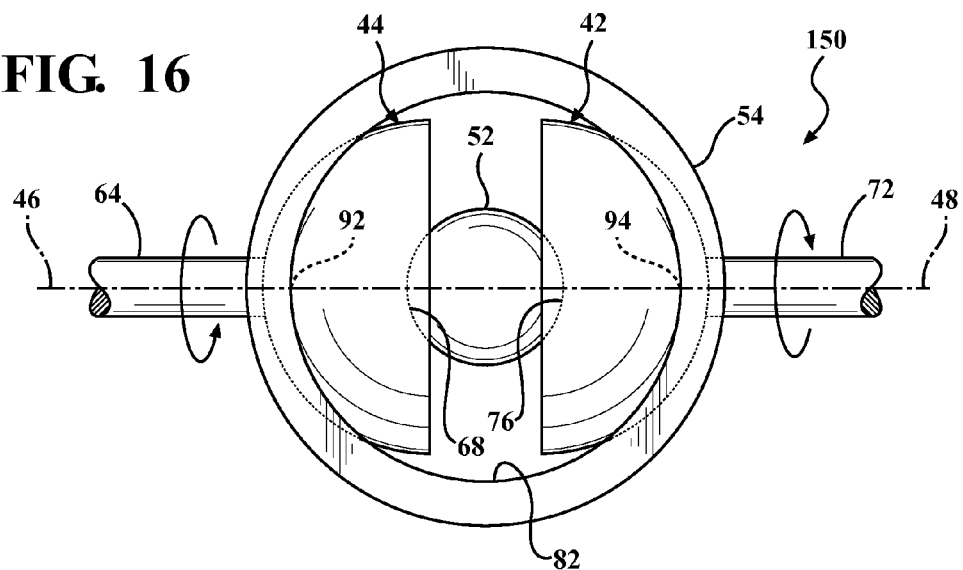
FIG. 16 is a schematic illustration of the drive mechanism of FIG. 15 viewed from a perspective perpendicular to the ring member operably connecting the input member to the output member.

With particular reference to FIGS. 15 and 16, the drive mechanism 150 may include the input member 42 rotatable about the input axis of rotation 46, and the output member 44 rotatable about the output axis of rotation 48. The ring member 54 overlays the input and output members 42 and 44 and operates to rotatably couple the input member 42 to the output member 44. The ring member 54 may be rotated in the rotational plane 56. The drive mechanism 150 operates to transfer rotational torque from the input member 42 to the output member 44 through the ring member 54. The drive mechanism 150 may employ the pivot bearing 52 that generally operates to maintain the input and output members 42 and 44 at the selected spacing distance 50. The pivot bearing 52 slideably engages the input pivot bearing pocket 68 and the output pivot bearing pocket 76. The pivot bearing 52 enables the input member 42 to rotate about the input axis of rotation 46 at a different rotational speed than that at which the output member 44 rotates about the output axis or rotation 48. The pivot bearing 52 also enables the input and output members 42 and 44 to pivot around the pivot bearing 52 to vary the angular orientation of the input and output members 42 and 44 relative to one another and the ring member 54 to adjust the speed ratio of the drive mechanism 150.

The ring member 54 encircles the input speed selector hub 62 and the output speed selector hub 70, with the ring traction surface 82 engaging the input traction surface 66 at the input contact location 92 and the output traction surface 74 at the output contact location 94. The ring member actuating forces $F_1$ and $F_2$ (see for example FIG. 15) may be applied to the ring member 54 for engaging and maintaining the ring member 54 in contact with the input traction surface 66 and output traction surface 74.

Similar to drive mechanism 40 (see FIG. 1), the speed ratio of the drive mechanism 150 may be selectively varied by adjusting the input contact location 92 at which the ring member 54 engages the input traction surface 66 of the input speed selector hub 62, and the output contact location 94 at which the ring member 54 engages the output traction surface 74 of the output speed selector hub 70. The output radial distance 98 between the output contact location 94 and the output axis of rotation 48, and thus the speed ratio of drive mechanism 150, may be selectively adjusted by pivoting the output member 44 around the pivot bearing 52, as illustrated, for example in FIG. 17. Pivoting the output member 44 clockwise (when viewed from the perspective of FIG. 17) increases the output radial distance 98 between the output contact location 94 and the output axis of rotation 48, thereby decreasing the rotational speed of the output member 48 relative to the input member 42. Conversely, pivoting the output member 44 counter-clockwise (when viewed from the perspective of FIG. 17) decreases the output radial distance 98 between the output contact location 94 and the output axis of rotation 48, thereby increasing the rotational speed of the output member 44 relative to the input member 42.

The rotational speed of output member 44 relative to input member 42 may alternatively be adjusted by pivoting the input member 42 around the pivot bearing 52, in a similar manner as previously described with respect to output member 44. For example, pivoting the input member 42 clockwise (when viewed from the perspective of FIG. 17), decreases the input radial distance 96 between the input contact location 92 and the input axis of rotation 46, thereby decreasing the rotational speed of the output member 44 relative to the input member 42. Conversely, pivoting the input member 42 counter-clockwise (when viewed from the perspective of FIG. 17) increases the input radial distance 96 between the input contact location 92 and the input axis of rotation 46, thereby increasing the rotational speed of the output member 44 relative to the input member 42. The speed ratio of the drive mechanism 150 may be adjusted by pivoting one or both of the input member 42 and output member 44 around the pivot bearing 52.

Figure 18:
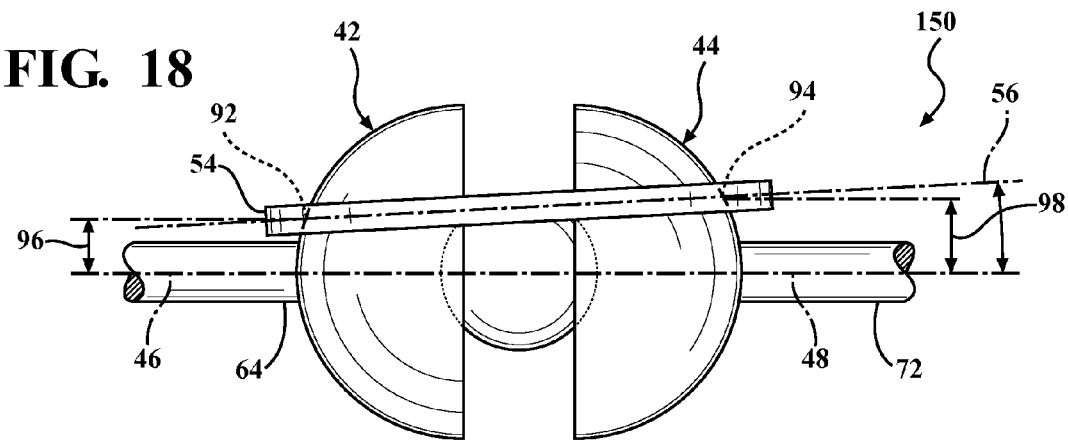
FIG. 18 is a schematic illustration of the exemplary drive mechanism of FIG. 15 illustrating the ring member pivoted to a selected position for adjusting the speed ratio of the drive mechanism.

With reference to FIGS. 15 and 18, the speed ratio of the drive mechanism 150 may also be adjusted by selectively changing the angular orientation of the ring member 54 relative to the input axis of rotation 46 and output axis of rotation 48. For example, in the exemplary configuration illustrated in FIG. 15, the ring member 54 is shown oriented substantially parallel to the input and output axis of rotation 46 and 48. This particular arrangement results in the input radial distance 96 between the input contact location 92 and input axis of rotation 46 being substantially equal to the output radial distance 98 between the output contact location 94 and the output axis of rotation 48, which results in the drive mechanism 150 operating at substantially a 1.0 speed ratio.

Changing the angular orientation of the ring member 54 relative to the input axis of rotation 46 and the output axis of rotation 48 may result in a corresponding change in the speed ratio of the drive mechanism 150. For example, in FIG. 18 the ring member 54 is illustrated pivoted counter-clockwise (as viewed from the perspective of FIG. 18), relative to its position, as illustrated in FIG. 15, about the output contact location 94, which decreases the input radial distance 96 while the output radial distance 98 remains substantially unchanged. This causes a corresponding decrease in the rotational speed of the output member 44 relative to the input member 42. This is just one example of how the speed ratio of the drive mechanism 150 may be affected by changes in the angular orientation of the ring member 54 relative in the input axis of rotation 46 and output axis of rotation 48. Other angular orientations may also be employed to effect changes in the speed ratio of drive mechanism 150. It is not necessary that one of the input radial distance 96 and the output radial distance 98 remain substantially constant when changing the angular orientation of the ring member 54, and both distances may be adjusted. Adjusting the angular orientation of the ring member 54 may also be used in combination with the previously described option of pivoting one or both of the input member 42 and output member 44 about the pivot bearing 52 to adjust the speed ratio of drive mechanism 150.

Figure 19:
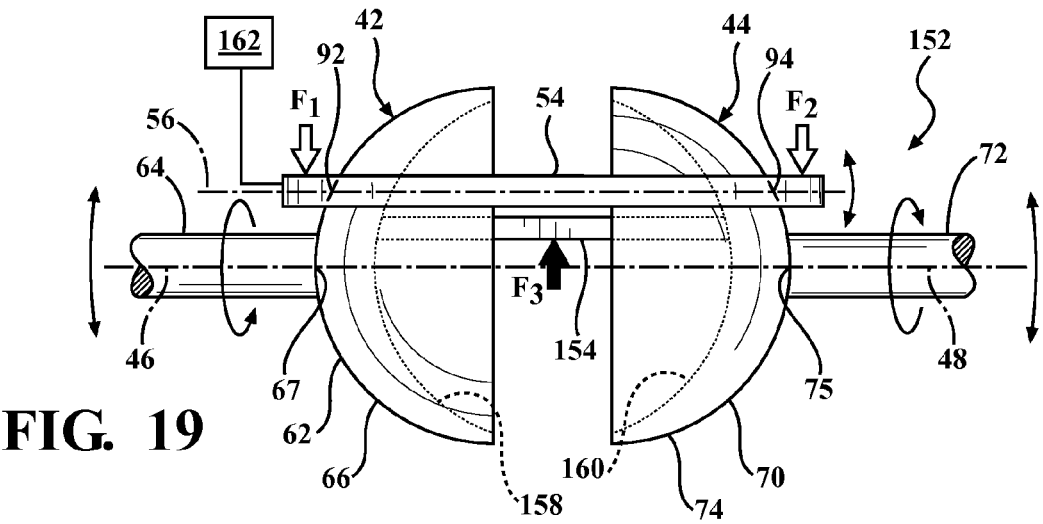
FIG. 19 is a schematic illustration of an alternately configured exemplary continuously variable drive mechanism employing a disk-shaped pivot bearing.
Figure 20:
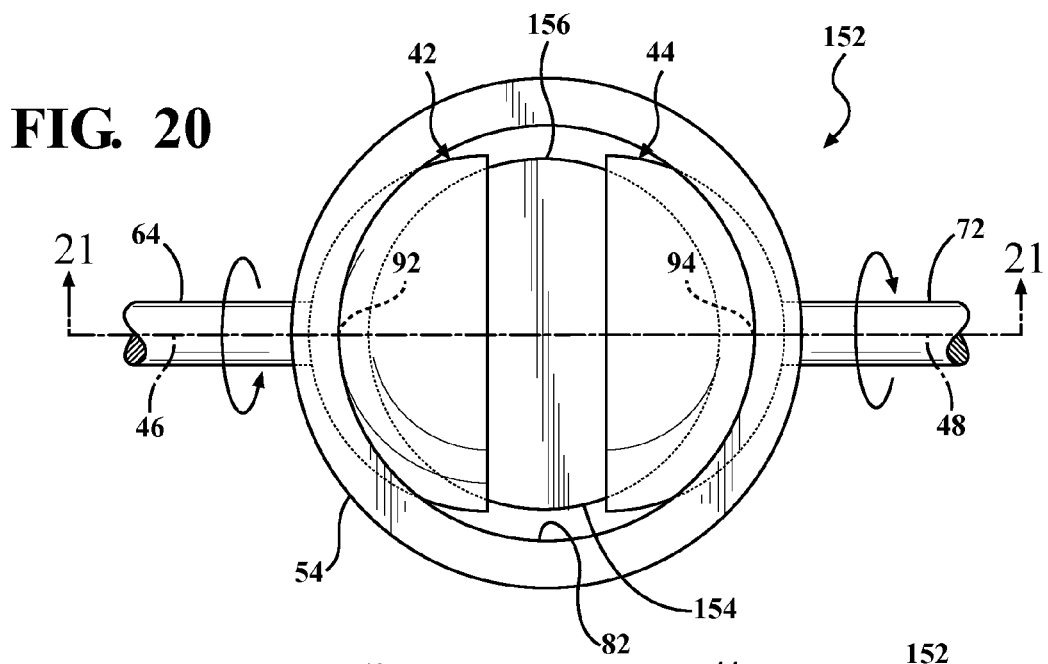
FIG. 20 is a schematic illustration of the drive mechanism of FIG. 19 viewed from a perspective perpendicular to the ring member operably connecting the input member to the output member.
Figure 21:
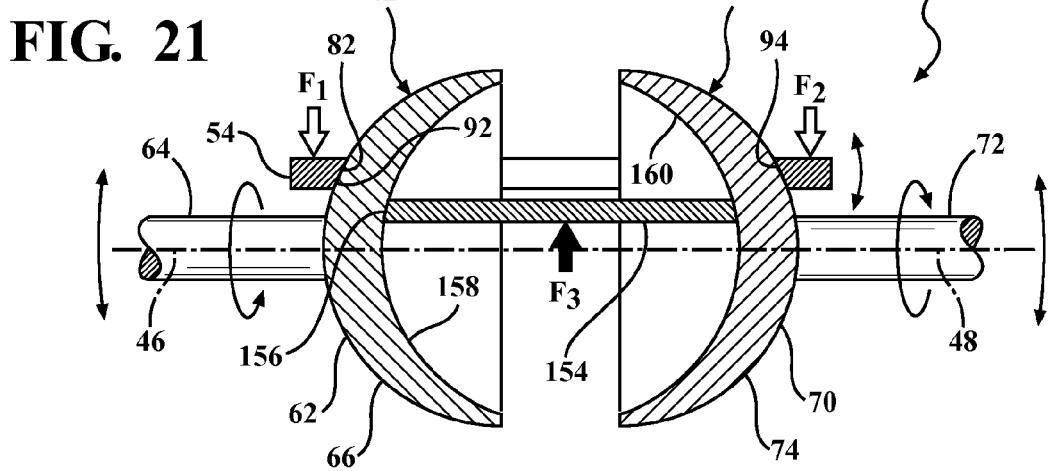
FIG. 21 is partial cross-sectional view of the exemplary drive mechanism of FIG. 19 taken along section line 21-21 of FIG. 20.

With reference to FIGS. 19-21, an exemplary continuously variable drive mechanism 152 may be similarly configured as drive mechanism 150 (see FIG. 15), but may employ an alternately configured pivot bearing 154. The drive mechanism 152 is otherwise similarly configured, and operates similarly, as drive mechanism 150. For example, the drive mechanism 152 may include the input member 42 rotatable about the input axis of rotation 46, and the output member 44 rotatable about the output axis of rotation 48. The ring member 54 overlays the input and output members 42 and 44 and operates to rotatably couple the input member 42 to the output member 44. The ring member 54 may be rotated in the rotational plane 56. The ring member 54 may be arranged relative to the input member 42 and output member 44 such that the first intersect 67 (i.e., the location at which the input axis of rotation 46 intersects the extended surface contour of the input traction surface 66) and the second intersect 75 (i.e., the location at which the output axis of rotation 48 intersects the extended surface contour of the output traction surface 74) are both located on the same side of the rotational plane 56 of the ring member 54. This arrangement causes the input member 42 to rotate in an opposite direction of the output member 44. The drive mechanism 152 operates to transfer rotational torque from the input member 42 to the output member 44 through the ring member 54.

The input member 42 may include the input speed selector hub 62 attached to the input shaft 64. The input speed selector hub 62 may include the input traction surface 66 that engages the ring member 54. The output member 44 may be similarly configured as the input member 42. For example, the output member 44 may include the output speed selector hub 70 attached to the output shaft 72. The output speed selector hub 70 may include the output traction surface 74 that engages the ring member 54.

With particular reference to FIGS. 20 and 21, the pivot bearing 154 may be disposed between the input member 42 and the output member 44. The pivot bearing may be generally configured as a disc having an outer circumferential edge 156 that slideably engages an input pivot bearing pocket 158 formed in the input speed selector hub 62 and an output pivot bearing pocket 160 formed in the output speed selector hub 70. The pivot bearing 154 may alternatively employ a different configuration, and may be configured, for example, as a ring or a partial spheroid. The outer circumferential edge 156 of the pivot bearing may be contoured to generally coincide with a contour of the input pivot bearing pocket 158 and the output pivot bearing pocket 160, or may alternatively have a different contour.

The input pivot bearing pocket 158 may be located generally along a side of the input speed selector hub 62 opposite the input shaft 64. The output pivot bearing pocket 160 may be located generally along a side of the output speed selector hub 70 opposite the output shaft 72. The input pivot bearing pocket 158 and output pivot bearing pocket 160 may employ any of a variety of geometric surface contours. The input and output pivot bearing pockets 158 and 160 may be sized and configured to accommodate a particular configuration of the pivot bearing 154 being employed.

With continued reference to FIGS. 19-21, the input member 42 and output member 44 are supported on the pivot bearing 154. Similar to ring member 54, the pivot bearing 154 may also operate to rotatably couple the input member 42 to the output member 44. The pivot bearing 154 slideably engages the input pivot bearing pocket 158 and the output pivot bearing pocket 160. This enables the input member 42 to rotate about the input axis of rotation 46 at a different rotational speed than that at which the output member 44 rotates about the output axis or rotation 48. The pivot bearing 154 also enables the input and output members 42 and 44 to pivot around the pivot bearing 154 to vary the angular orientation of the input and output members 42 and 44 relative to one another and the ring member 54 to adjust a speed ratio of the drive mechanism 152.

The ring member 54 is generally free to rotate in the rotational plane 56 to transfer rotational energy from the input member 42 to the output member 44. The ring member 54 may be supported in a housing or fixture suitably configured to enable the ring member 54 to rotate in its rotational plane 56. An angular orientation of the ring member rotational plane 56 may be maintained in a fixed position relative to the input axis of rotation 46 and/or output axis rotation 48, or selectively varied. Various actuators may be employed for controlling the angular orientation of the ring member 54 relative to the input and output members 42 and 44.

The ring member 54 overlays the input speed selector hub 62 and the output speed selector hub 70, with the ring traction surface 82 engaging the input traction surface 66 at the input contact location 92 and the output traction surface 74 at the output contact location 94. Contact between the ring member 54 and the input member 42 and output member 44 may be maintained through opposing forces applied to the ring member 54 and the pivot bearing 154. A maximum torque that may be effectively transferred between the input member 42 and the output member 44 through the ring member 54 is generally a function of the traction forces occurring between the ring member 54 and the input and output speed selector hubs 62 and 70. The traction forces are reactive forces generated through engagement of the ring member 54 with the input speed selector hub 62 and the output speed selector hub 70, and are a function of the magnitude of applied ring member actuation forces $F_1$ and $F_2$ that operate to urge the ring member 54 into engagement with the input and output speed selector hubs 62 and 70, and a pivot bearing actuating force $F_3$ that operates to urge the pivot bearing 154 into engagement with the input pivot bearing pocket 158 and the output pivot bearing pocket 160. The ring member actuating forces $F_1$ and $F_2$ may be applied generally perpendicular to the rotational plane 56 of the ring member 54, and the pivot bearing actuating force may be applied generally perpendicular to a plane of the pivot bearing 152 in a direction opposite the ring member actuating forces $F_1$ and $F_2$.

The traction forces, and thus the torque capacity of the drive mechanism, may be selectively adjusted by controlling the magnitude of the ring member actuating forces F1 and F2 and the pivot bearing actuating force F3 used to clamp the input speed selector hub 62 and the output speed selector hub 70 between the ring member 54 and the pivot bearing 154. For example, the ring member actuating forces $F_1$ and $F_2$ may be applied to the ring member 54, and the opposing pivot bearing actuating force $F_3$ may be applied to the pivot bearing 154. The ring member and pivot bearing actuating forces $F_1$, $F_2$ and $F_3$ may be of equal magnitude or one or more may be a different magnitude. The pivot bearing actuating force $F_3$ urges the pivot bearing in an upward direction (as viewed from the perspective of FIG. 19) and toward the progressively narrower portion of the input pivot bearing pocket 158 and the output pivot bearing pocket 160. This causes the pivot bearing 154 to impart a generally radially outward force on the input speed selector hub 62 and the output speed selector hub 70 that urges the input speed selector hub 62 and the output speed selector hub 70 to move away from each other. The outward biasing force generated by the pivot bearing 154 may be counteracted by the ring member actuating forces $F_1$ and $F_2$ imposed on the ring member 54. The ring member actuating forces $F_1$ and $F_2$ urge the ring member 54 in a downward direction (as viewed from the perspective of FIG. 19) and toward the progressively wider portion of the input traction surface 62 and the output traction surface 74. This causes the ring member 54 to impart a generally radially inward force on the input speed selector hub 62 and output speed selector hub 70 that tends to urge the two members toward one another. The opposing ring member and pivot bearing actuating forces $F_1$, $F_2$ and $F_3$ operate to clamp the input speed selector hub 62 and the output speed selector hub 70 between the ring member 54 and the pivot bearing 154. Generally, increasing one or more of the ring member and pivot bearing actuating forces $F_1$, $F_2$ and $F_3$ tends to increase the traction force occurring between the ring member 54 and the input speed selector hub 62 and the output speed selector hub 70, and thus the maximum torque that may be transferred between the input member 42 and the output member 44. Conversely, decreasing one or more of the ring member and pivot bearing actuating forces $F_1$, $F_2$ and $F_3$ tends to decreases the traction forces, and thus, the maximum torque that may be transferred between the input member 42 and the output member 44.

Figure 17:
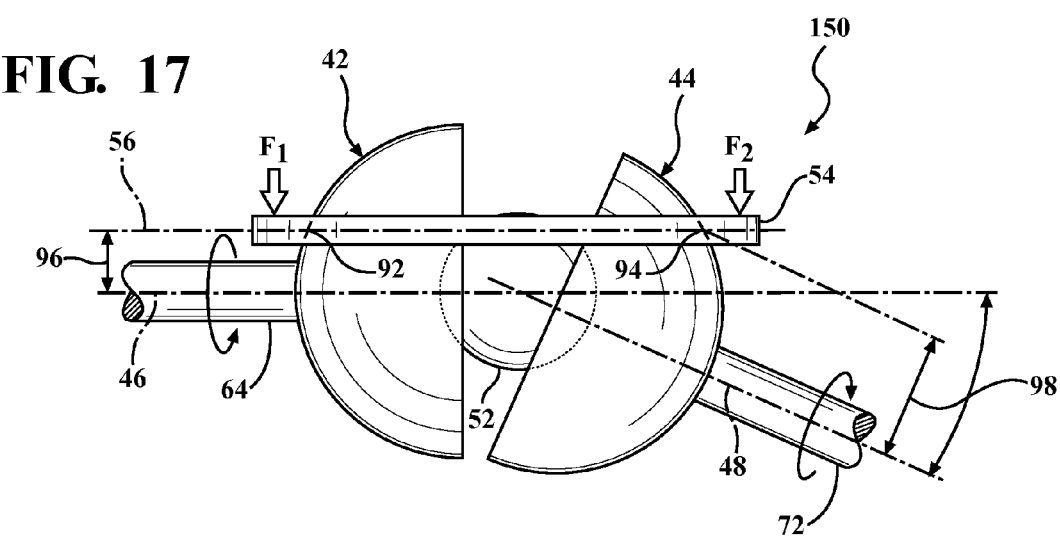
FIG. 17 is a schematic illustration of the exemplary drive mechanism of FIG. 15 illustrating the output member pivoted to a selected position for adjusting the speed ratio of the drive mechanism.

The drive mechanism 152 operates similar to drive mechanism 150, and will thus be described with reference also to FIGS. 17 and 18. Similar to drive mechanism 150 (see FIGS. 17 and 18), the speed ratio of the drive mechanism 150 (see FIGS. 19-21) may be selectively varied by adjusting the input contact location 92 at which the ring member 54 engages the input traction surface 66 of the input speed selector hub 62, and the output contact location 94 at which the ring member 54 engages the output traction surface 74 of the output speed selector hub 70. The output radial distance 98 between the output contact location 94 and the output axis of rotation 48, and thus the speed ratio of drive mechanism 152, may be selectively adjusted by pivoting the output member 44 around the pivot bearing 52, as illustrated, for example, in FIG. 17 in connection with drive mechanism 150. Pivoting the output member 44 clockwise (when viewed from the perspective of FIGS. 17 and 19) increases the output radial distance 98 between the output contact location 94 and the output axis of rotation 48, thereby decreasing the rotational speed of the output member 48 relative to the input member 42. Conversely, pivoting the output member 44 counter-clockwise (when viewed from the perspective of FIGS. 17 and 19) decreases the output radial distance 98 between the output contact location 94 and the output axis of rotation 48, thereby increasing the rotational speed of the output member 44 relative to the input member 42.

The rotational speed of output member 44 relative to input member 42 may alternatively be adjusted by pivoting the input member 42 around the pivot bearing 52, in a similar manner as previously described with respect to output member 44. For example, pivoting the input member 42 clockwise (when viewed from the perspective of FIGS. 17 and 19), decreases the input radial distance 96 between the input contact location 92 and the input axis of rotation 46, thereby decreasing the rotational speed of the output member 44 relative to the input member 42. Conversely, pivoting the input member 42 counter-clockwise (when viewed from the perspective of FIGS. 17 and 19) increases the input radial distance 96 between the input contact location 92 and the input axis of rotation 46, thereby increasing the rotational speed of the output member 44 relative to the input member 42. The speed ratio of the drive mechanism 152 may be adjusted by pivoting one or both of the input member 42 and the output member 44 around the pivot bearing 52.

With continued reference to FIGS. 15, 18 and 19, the speed ratio of the drive mechanism 152 may also be adjusted by selectively changing the angular orientation of the ring member 54 relative to the input axis of rotation 46 and output axis of rotation 48. For example, in the exemplary configuration illustrated in FIG. 19, the ring member 54 is shown oriented substantially parallel to the input and output axis of ration 46 and 48. This particular arrangement results in the input radial distance 96 between the input contact location 92 and the input axis of rotation 46 being substantially equal to the output radial distance 98 between the output contact location 94 and the output axis of rotation 48, which results in the drive mechanism 150 operating at substantially a 1.0 speed ratio. Changing the angular orientation of the ring member 54 relative to the input axis of rotation 46 and output axis of rotation 48 may result in a corresponding change in the speed ratio of the drive mechanism 152. For example, in FIG. 18 the ring member 54 is illustrated pivoted counter-clockwise (as viewed from the perspective of FIG. 18), relative to its position, as illustrated in FIGS. 15 and 19, about the output contact point 94, which decreases the input radial distance 96 while the output radial distance 98 remains substantially unchanged. This causes a corresponding decrease in the rotational speed of the output member 44 relative to input member 42. This is just one example of how the speed ratio of the drive mechanism 152 may be affected by changes in the angular orientation of the ring member 54 relative in the input axis of rotation 46 and output axis of rotation 48. Other angular orientations may also be employed to effect changes in the speed ratio of drive mechanism 152. It is not necessary that one of the input radial distance 96 and the output radial distance 98 remain substantially constant when changing the angular orientation of the ring member 54, and both distances may be adjusted. Adjusting the angular orientation of the ring member 54 may also be used in combination with the previously described option of pivoting one or both of the input member 42 and output member 44 about the pivot bearing 52 to adjust the speed ratio of drive mechanism 152.

With particular reference to FIG. 19, the drive mechanism 152 may include a traction force sensor 162 operably connected to the ring member 54 for detecting the traction force occurring between the ring member 54 and the input speed selector hub 62 and/or the output speed selector hub 70. The traction force sensor 162 may be configured to detect the traction force directly, or may be configured to detect one or more measurable attributes, the characteristics of which change in response to changes in a magnitude of the traction force. For example, the traction sensor may be capable of measuring lateral movement of the ring member 54 within its rotational plane 56. This information may then be used by the traction force sensor, or delivered to a separate computational device, for determining the traction force occurring between the ring member 54 and the input member 42 and/or output member 44. The traction force and/or measured attribute (i.e., lateral movement of the ring member 54) may be used to determine if it may be advantageous to make adjustments in the magnitude of the ring member actuating forces $F_1$ and $F_2$ and the pivot bearing actuating force $F_3$ to more closely target a traction force that may be appropriate for the rotational torque being transmitted through the drive mechanism 152.

With reference to FIG. 22, an alternatively configured continuously variable drive mechanism 164 may include a stepped input member 166 and a stepped output member 168. The stepped input member 166 may include an input speed selector hub 170 attached to the input shaft 64 and an output speed selector hub 172 attached to the output shaft 72. The input speed selector hub 170 and the output speed selector hub 172 may each include multiple steps 174 that correspond to selectable predetermined speed options. The speed ratio of the drive mechanism 164 may be selectively adjusted in the manner previously described with respect to drive mechanism 40 (see FIGS. 1-7), with each step corresponding to a discrete speed ratio. For example, the speed ratio of the drive mechanism 164 may be adjust by varying the angular orientation of the input rotational axis 46 and/or the output rotational axis 48 relative to the rotational plane 56 of the ring member 54, as previously described with respect to drive mechanism 40.

Referring to FIG. 23 an alternately configured continuously variable drive mechanism 176 may include an input member 178 and an output member 180 positioned adjacent the input member 178. The input member 178 is rotatable about an input axis of rotation 182 and the output member 180 is rotatable about an output axis of rotation 184. The input member 178 may include an input speed selector hub 186 attached to an input shaft 187. The speed selector hub 186 includes an input traction surface 188. The output member 180 may include an output speed selector hub 190 attached to an output shaft 191. The output speed selector hub 190 may include an output traction surface 192. A pivot bearing 194 may be fixedly attached to the output member 180 and slideably engages a recessed input pivot bearing pocket 196 formed in the input speed selector hub 186.

A ring member 198 overlays the input and output members 178 and 180, and operates to rotatably couple the input member 178 to the output member 180. The ring member 198 is rotatable in a rotational plane 200. The drive mechanism 176 operates to transfer rotational torque from the input member 178 to the output member 180 through the ring member 198.

The input member 178 is supported on the pivot bearing 194. The pivot bearing 194 enables the input member 178 to rotate about the input axis of rotation 182 at a different rotational speed than that at which the output member 180 rotates about the output axis of rotation 184. The pivot bearing 194 also enables the input and output members 178 and 180 to pivot relative to one another to vary the angular orientation of the input and output members 178 and 180 relative to each other and the ring member 198 to adjust a speed ratio of the drive mechanism 176.

The speed ratio of the drive mechanism 176 may be selectively varied by adjusting an input contact location 202 at which the ring member 198 engages the input traction surface 188 of the input speed selector hub 186, and an output contact location 204 at which the ring member 198 engages the output traction surface 192 of the output speed selector hub 190. An output radial distance 208 between the output contact location 204 and the output axis of rotation 184, and thus the speed ratio of drive mechanism 176, may be selectively modified by pivoting the output member 44 relative to the rotational plane 200 of the ring member 198. The rotational speed of output member 180 relative to input member 178 may alternatively be adjusted by pivoting the input member 178 around the pivot bearing 194. The speed ratio of the drive mechanism 176 may be adjusted by pivoting one or both of the input member 178 and output member 180 relative to the ring member 198. Alternatively, the speed ratio of the drive mechanism 176 may be adjusted by selectively changing the angular orientation of the ring member 198 relative to the input axis of rotation 182 and the output axis of rotation 184.

With reference to FIG. 24, an alternately configured continuously variable drive mechanism 210 may include an input member 212 and an output member 214 positioned adjacent the input member 212. The input member 212 is rotatable about an input axis of rotation 216 and the output member 214 is rotatable about an output axis of rotation 218. The input member 212 may include an input speed selector hub 220 attached to an input shaft 221. The input speed selector hub 220 including an input traction surface 222. The output member 214 may include an output speed selector hub 224 attached to an output shaft 225. The output speed selector hub 224 may include an output traction surface 226. The output speed selector hub 224 may also function as a pivot bearing 228 and slideably engages a recessed input pivot bearing pocket 230 formed in the input speed selector hub 220.

A ring member 232 overlays the input and output members 212 and 214, and operates to rotatably couple the input member 212 to the output member 214. The ring member 232 is rotatable in a rotational plane 234. The drive mechanism 210 operates to transfer rotational torque from the input member 212 to the output member 214 through the ring member 232.

The input member 212 is supported on the output member 214, which also functions as the pivot bearing 228. This configuration enables the input member 212 to rotate about the input axis of rotation 216 at a different rotational speed than that at which the output member 214 rotates about the output axis of rotation 213. The arrangement also enables the input and output members 212 and 214 to pivot relative to one another to vary the angular orientation of the input and output members 212 and 214 relative to each other and the ring member 232 to adjust a speed ratio of the drive mechanism 210.

The speed ratio of the drive mechanism 210 may be selectively varied by adjusting an input contact location 236 at which the ring member 232 engages the input traction surface 222 of the input speed selector hub 220, and an output contact location 238 at which the ring member 232 engages the output traction surface 226 of the output speed selector hub 224. An output radial distance 242 between the output contact location 238 and the output axis of rotation 216, and thus the speed ratio of drive mechanism 210, may be selectively changed by pivoting the output member 214 relative to the rotational plane 234 of the ring member 232.

The rotational speed of the output member 214 relative to input member 212 may alternatively be adjusted by pivoting the input member 212 around the pivot bearing 228 (i.e., output speed selector hub 224). The speed ratio of the drive mechanism 210 may be adjusted by pivoting one or both of the input member 212 and the output member 214 relative to the ring member 232. Alternatively, the speed ratio of the drive mechanism 210 may be adjusted by selectively changing the angular orientation of the ring member 232 relative to the input axis of rotation 216 and the output axis of rotation 218.

Figure 25:
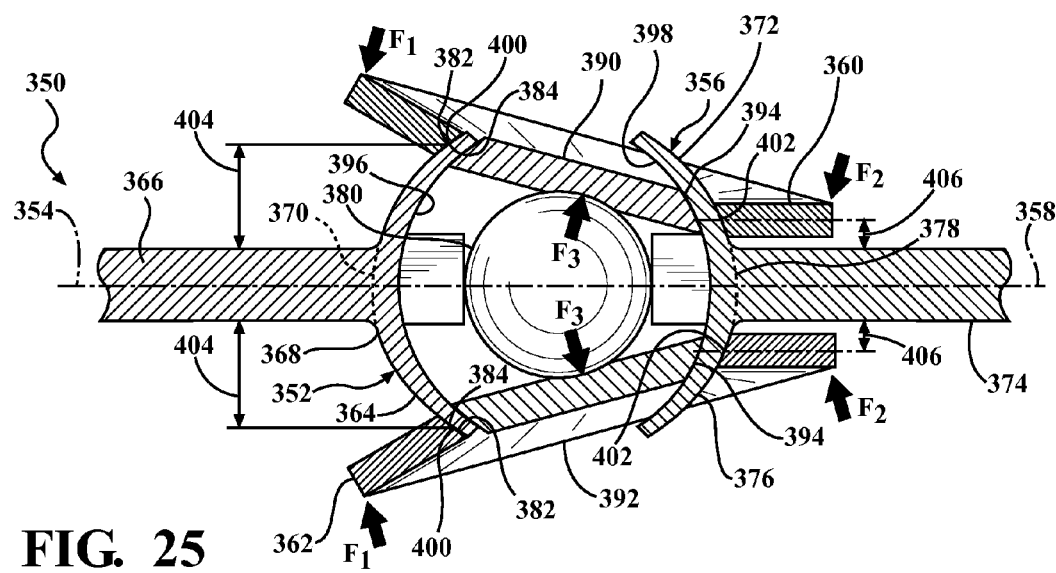
FIG. 25 is a schematic partial cross-sectional view of an alternately configured exemplary continuously variable drive mechanism employing a pair of ring members operably connecting the input member to the output member and a pair of disk-shaped pivot bearings.

With reference to FIG. 25, an exemplary continuously variable drive mechanism 350 may include a pair of ring members arranged on opposite sides of the drive mechanism for transferring torque between an input member and an output member. The drive mechanism 350 may include an input member 352 rotatable about an input axis of rotation 354, and an output member 356 rotatable about an output axis of rotation 358. A first ring member 360 and second ring member 362 arranged opposite the first ring member 360 overlay the input and output members 352 and 354, and operate to rotatably couple the input member 352 to the output member 356. The drive mechanism 350 operates to transfer rotational torque from the input member 352 to the output member 356 through the first and second ring members 360 and 362.

The input member 352 may include an input speed selector hub 364 attached to an input shaft 366. The input speed selector hub 364 may include an input traction surface 368 that engages the first and second ring members 360 and 362. An extended portion of the surface contour of the input traction surface 368 intersects the input axis of rotation 354 at a first intersect 370. The output member 356 may be similarly configured as the input member 352. For example, the output member 356 may include an output speed selector hub 372 attached to an output shaft 374. The output speed selector hub 372 may include an output traction surface 376 that engages the first and second ring members 360 and 362. An extended portion of the output traction surface 372 intersects the output axis of rotation 358 at a second intersect 378.

A first pivot bearing 380 may be disposed between the input member 352 and the output member 356. The first pivot bearing 380 may slideably engage the input member 352 and the output member 356, and generally operates to maintain the input and output members 352 and 356 at a selected spacing.

The first and second ring members 360 and 362 may have the substantially the same configuration, but may be arranged as mirror opposites of one another in drive mechanism 350. The first and second ring members 360 and 362 may be configured as a generally circular ring having an inner edge 382 defines a ring traction surface 384 that engages the input traction surface 368 of the input member 352 and the output traction surface 376 of the output member 356. The ring traction surface 384 may include various contours, examples of which are illustrated in FIGS. 4A-D.

The first and second ring members 352 and 356 may be arranged relative to the input member 352 and the output member 354 such that the first intersect 370 (i.e., the location at which the input axis of rotation 354 intersects the extended surface contour of the input traction surface 368) and the second intersect 378 (i.e., the location at which the output axis of rotation 358 intersects the extended surface contour of the output traction surface 376) are both located on the same side of the first and second ring members 360 and 362. This arrangement causes the input member 352 to rotate in an opposite direction of the output member 356.

The drive mechanism 350 may include a second pivot bearing 390 and a third pivot bearing 392 arranged on an opposite side of the first pivot bearing 380. The second and third pivot bearings 390 and 392 may be supported on the first pivot bearing 380. The second and third pivot bearings 390 and 392 may be configured substantially the same, but may be arranged as minor opposites of one another in drive mechanism 350. The second and third pivot bearings 390 and 392 may include an outer circumferential edge 394 that slideably engages an input pivot bearing pocket 396 formed in the input speed selector hub 364 and an output pivot bearing pocket 398 formed in the output speed selector hub 372.

The input member 352 and output member 356 are supported on the second and third pivot bearings 390 and 392. Similar to the first and second ring members 360 and 362, the second and third pivot bearings 390 and 392 may also operate to rotatably couple the input member 352 to the output member 356. The second and third pivot bearings 390 and 392 slideably engage the input pivot bearing pocket 396 and the output pivot bearing pocket 398. This enables the second and third pivot bearings 390 and 392 to pivot around the first pivot bearing 380 relative to the input member 352 and the output member 356.

The first and second ring members 360 and 362 are generally free to rotate in a radial plane of the ring member to transfer rotational energy from the input member 352 to the output member 354. The first and second ring members 360 and 362 may be supported in a housing or fixture suitably configured to enable the ring members to rotate in their respective radial planes.

The first and second ring members 360 and 362 overlay the input speed selector hub 364 and the output speed selector hub 372, with the ring traction surface 384 engaging the input traction surface 368 at an input contact location 400 and the output traction surface 376 at an output contact location 402. Contact between the first and second ring members 360 and 362 and the input member 352 and output member 356 may be maintained through opposing forces applied to the first and second ring members 360 and 362 and the second and third pivot bearings 390 and 392 by the first pivot bearing 380. A maximum torque that may be effectively transferred between the input member 352 and the output member 356 through the first and second ring members 360 and 362 is generally a function of the traction forces occurring between the first and second ring members 360 and 362 and the input and output speed selector hubs 364 and 372. The traction forces are a function of the magnitude of applied ring member actuation forces $F_1$ and $F_2$ that operate to urge the first and second ring members 360 and 362 into engagement with the input and output speed selector hubs 364 and 372, and a pivot bearing actuating force $F_3$ that operates to urge the second and third pivot bearings 390 and 392 engagement with the input pivot bearing pocket 396 and the output pivot bearing pocket 398.

The speed ratio of the drive mechanism 350 may be adjusted by selectively changing an angular orientation of the first and second ring members 360 and 362 relative to the input axis of rotation 354 and output axis of rotation 358. The angular orientation may be adjusted by simultaneously pivoting the first and second ring members 360 and 362 in opposite directions around the first pivot bearing 380, thereby changing the location at which the first and second ring members 360 and 362 contact the input member 352 and output member 356. For example, in the exemplary configuration illustrated in FIG. 25, the input and output ring members 360 and 362 are shown arranged such that an input radial distance 404 between the input contact location and the input axis of rotation 354 is greater than an the output radial distance 406 between the output contact location 402 and the output axis of rotation 358. This arrangement results in the drive mechanism 350 operating at a speed ratio greater than 1.0 and the output member 356 rotating faster than the input member 352. Simultaneously pivoting the first ring member 360 counter-clockwise (as viewed from the perspective of FIG. 25) and the second ring member 362 clockwise (as viewed from the perspective of FIG. 25) decreases the input radial distance 404 and increases the output radial distance 406, thereby resulting in a corresponding decrease in the speed ratio of the drive mechanism 350. Conversely, simultaneously pivoting the first ring member 360 clockwise (as viewed from the perspective of FIG. 25) and the second ring member 362 counter-clockwise (as viewed from the perspective of FIG. 25) increases the input radial distance 404 and decreases the output radial distance 406, thereby resulting in a corresponding increase in the speed ratio of the drive mechanism 350.

Figure 26:
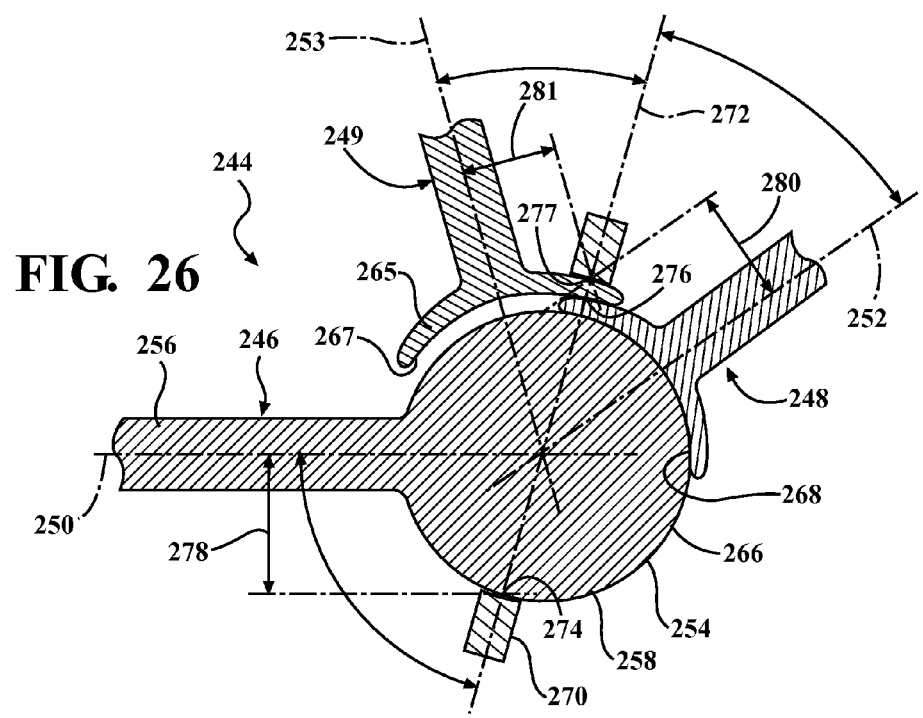
FIG. 26 is a schematic partial cross-sectional view of an alternately configured exemplary continuously variable drive mechanism employing multiple output members.

With reference to FIG. 26, an alternately configured continuously variable drive mechanism 244 may include an input member 246 and at least a first output member 248 and a second output member 249 positioned adjacent the input member 246. The input member 246 is rotatable about an input axis of rotation 250, the first output member 248 is rotatable about a first output axis of rotation 252 and the second output member 259 is rotatable about a second output axis of rotation 253. The input member 246 may include an input speed selector hub 254 attached to an input shaft 256. The input speed selector hub 254 may include an input traction surface 258. The first output member 248 may include a first output speed selector hub 260 attached to a first output shaft 262. The first output speed selector hub 260 may include a first output traction surface 264. The input speed selector hub 254 may also function as a pivot bearing 266 and slideably engage a recessed first output pivot bearing pocket 268 formed in the first output speed selector hub 260. The second output member 249 may include a second output speed selector hub 261 attached to a second output shaft 263. The second output speed selector hub 261 may include an outer second output traction surface 265 and an inner second output traction surface 267 that engages the first output traction surface 264 of the first output member 248. The inner second output traction surface is separated from the input traction surface 258 of the input speed selector hub 254.

A ring member 270 overlays the input and output members 246, 248 and 249, and operates to rotatably couple the input member 246 to the first and second output members 248 and 249. The ring member 270 is rotatable in a rotational plane 272. The drive mechanism 242 operates to transfer rotational torque from the input member 246 to the first and second output members 248 and 249 through the ring member 270.

The first output member 248 is supported on the input member 246/pivot bearing 266, and the second output member 249 is supported on the first output member 248. This configuration enables the first and second output member 248 and 249 to rotate about their respective first and second output axis of rotation 252 and 253 at a different rotational speed than each other and also a different rotational speed than the input member 246 rotates about the input axis of rotation 250. The arrangement also enables the input and first and second output members 246, 248 and 249 to pivot relative to one another to vary the angular orientation of the input and output members 246, 248 and 249 relative to each other and the ring member 270 to adjust a speed ratio of the drive mechanism 244.

The speed ratio of the drive mechanism 244 may be selectively varied by selectively adjusting an input contact location 274 at which the ring member 270 engages the input traction surface 258 of the input speed selector hub 254, a first output contact location 276 at which the first output speed selector hub 260 engages the inner second output traction surface 267 of the second output speed selector hub 261, and a second output contact location 277 at which the ring member 270 engages the outer second output traction surface 266 of the second output speed selector hub 261. An input radial distance 278 between the input contact location 274 and the input axis of rotation 250, and thus the speed ratio of drive mechanism 244, may be selectively changed by pivoting the input member 246 relative to the rotational plane 272 of the ring member 270. Pivoting the input member 246 clockwise (as viewed from the perspective of FIG. 26) increases the input radial distance 278 between the input contact location 274 and the input axis of rotation 250, thereby increasing the rotational speed of the first and second output member 248 and 249 relative to the input member 246. Conversely, pivoting the input member 246 counter-clockwise (when viewed from the perspective of FIG. 26) decreases the input radial distance 278 between the input contact location 274 and the input axis of rotation 250, thereby decreasing the rotational speed of the first and second output members 248 and 249 relative to the input member 246.

The rotational speed of the first and second output members 248 and 249 relative to input member 212 may alternatively be individually adjusted by pivoting the respective output members relative to the ring member 270. For example, pivoting the first output member 248 clockwise (as viewed from the perspective of FIG. 26), increases the first output radial distance 280 between the first output contact location 276 and the first output axis of rotation 252, thereby decreasing the rotational speed of the first output member 248 relative to the input member 246. Conversely, pivoting the first output member 248 counter-clockwise (as viewed from the perspective of FIG. 26) decreases the first output radial distance 280 between the first output contact location 276 and the first output axis of rotation 252, thereby increasing the rotational speed of the first output member 248 relative to the input member 246.

With continued reference to FIG. 26, the rotational speed of the second output member 249 may be adjusted by pivoting the second output member 249 clockwise (as viewed from the perspective of FIG. 26), which decreases the second output radial distance 281 between the second output contact location 277 and the second output axis of rotation 253, thereby increasing the rotational speed of the second output member 249 relative to the input member 246. Conversely, pivoting the second output member 249 counter-clockwise (as viewed from the perspective of FIG. 26) increases the second output radial distance 281 between the second output contact location 277 and the second output axis of rotation 253, thereby decreasing the rotational speed of the second output member 249 relative to the input member 246.

The speed ratio of the drive mechanism 244 may be adjusted by pivoting one or more of the input member 246 and the first and second output members 248 and 249 relative to the ring member 232.

Figure 27:
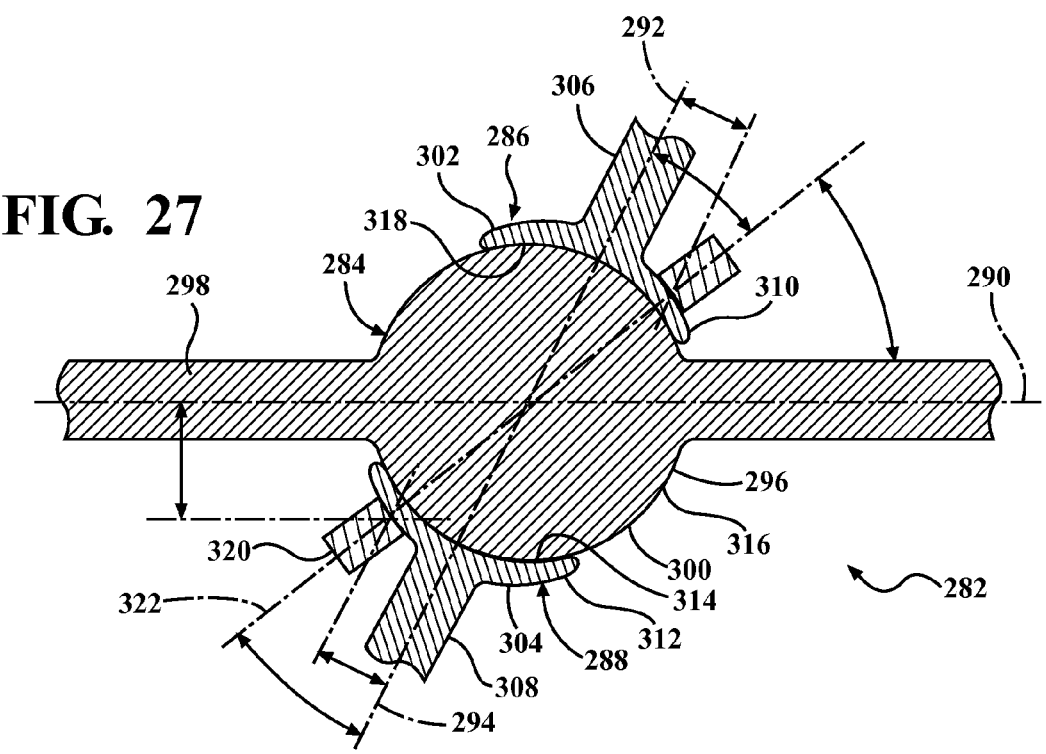
FIG. 27 is a schematic partial cross-sectional view of an alternately configured exemplary continuously variable drive mechanism employing multiple output members.

With reference to FIG. 27, an alternately configured continuously variable drive mechanism 282 may include a first member 284 and at least a second member 286 and a third member 288 positioned adjacent the first member 284. The first member 284 is rotatable about a first axis of rotation 290, the second member 286 is rotatable about a second axis of rotation 292 and the third member 288 is rotatable about a third axis of rotation 294. The first member 284 may include a first speed selector hub 296 attached to a first shaft 298. The first speed selector hub 296 may include a first traction surface 300. The second member 286 may include a second speed selector hub 302 attached to a second shaft 306. The second speed selector hub 302 may include a second traction surface 310. The third member 288 may include a third speed selector hub 304 attached to a third shaft 308. The third speed selector hub 304 may include a third traction surface 312.

The first speed selector hub 296 may also function as a pivot bearing 316 and slideably engage a recessed second pivot bearing pocket 318 formed in the second speed selector hub 302, and a recessed pivot bearing pocket 314 formed in the third speed selector hub 304.

A ring member 320 overlays the first, second and third members 284, 286 and 288, and operates to rotatably couple the first member 284 to the second and third members 286 and 288. The ring member 320 is rotatable in a rotational plane 322. The drive mechanism 282 operates to transfer rotational torque between the first member 284 and the second and third members 286 and 288 through the ring member 320.

The second and third member 286 and 288 are supported on the first member 284/pivot bearing 316. This configuration enables the second and third members 286 and 288 to rotate about their respective second and third output axis of rotation 290 and 292 at a different rotational speed than each other and also a different rotational speed than the first member 284 rotates about the first axis of rotation 290. The arrangement also enables the first, second and third members 284, 286 and 288 to pivot relative to one another to vary the angular orientation of the first, second and third members 284, 286 and 288 relative to each other and the ring member 320 to adjust a speed ratio of the drive mechanism 282.

Figure 28:
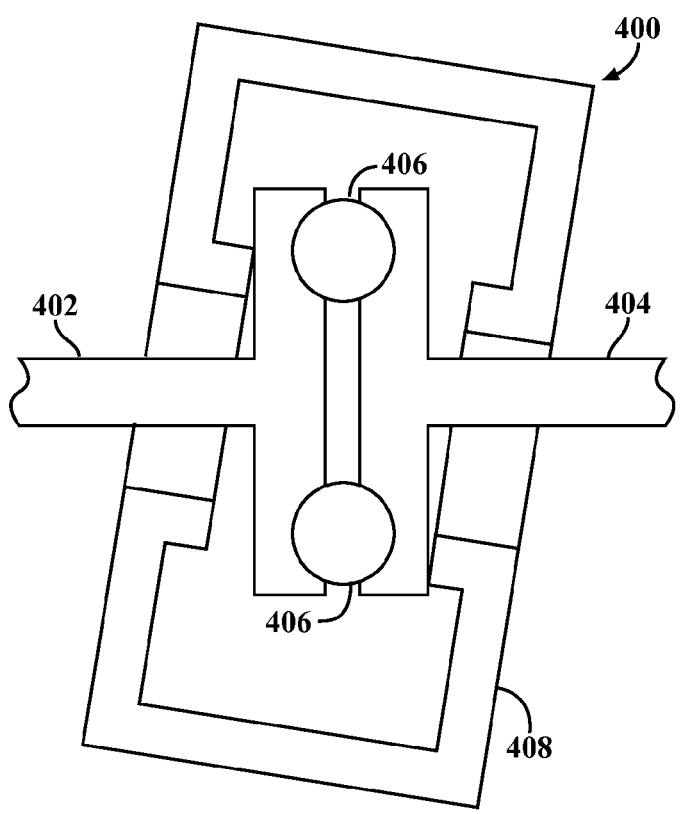
FIG. 28 is schematic illustration of an alternately configured exemplary continuously variable drive mechanism.

With reference to FIG. 28, a continuously variable drive mechanism 400 for transferring torque between an input member 402 and an output member 404 is illustrated. The input and output members 402 and 404 rotatably engage one or more bearing members 406 disposed between the input and output members 402 and 404. The drive mechanism 400 may also include an intermediate disk 408 that develops normal forces for compressing the input and output members 402 and 404 toward each other and against the bearing members 406. This arrangement may have an advantage of reducing bearing and housing forces, providing savings in cost and weight.

Figure 29:
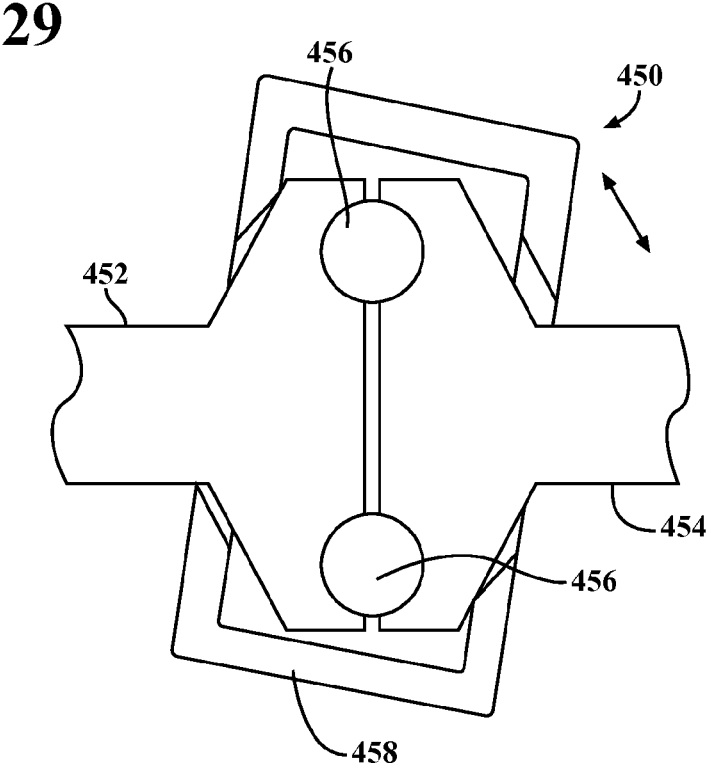
FIG. 29 is a schematic illustration of an exemplary continuously variable drive mechanism.

With reference to FIG. 29, a continuously variable drive mechanism 450 for transferring torque between and input member 452 and an output member 454 is illustrated. The input and output members 452 and 454 rotatably engage one or more bearing members 456 disposed between the input and output members 452 and 454. The drive mechanism 450 may also include an intermediate disk 458 that develops normal forces for compressing the input and output members 452 and 454 toward each other and against the bearing members 456. This arrangement may have an advantage of reducing bearing and housing forces, providing savings in cost and weight.

Figure 30:
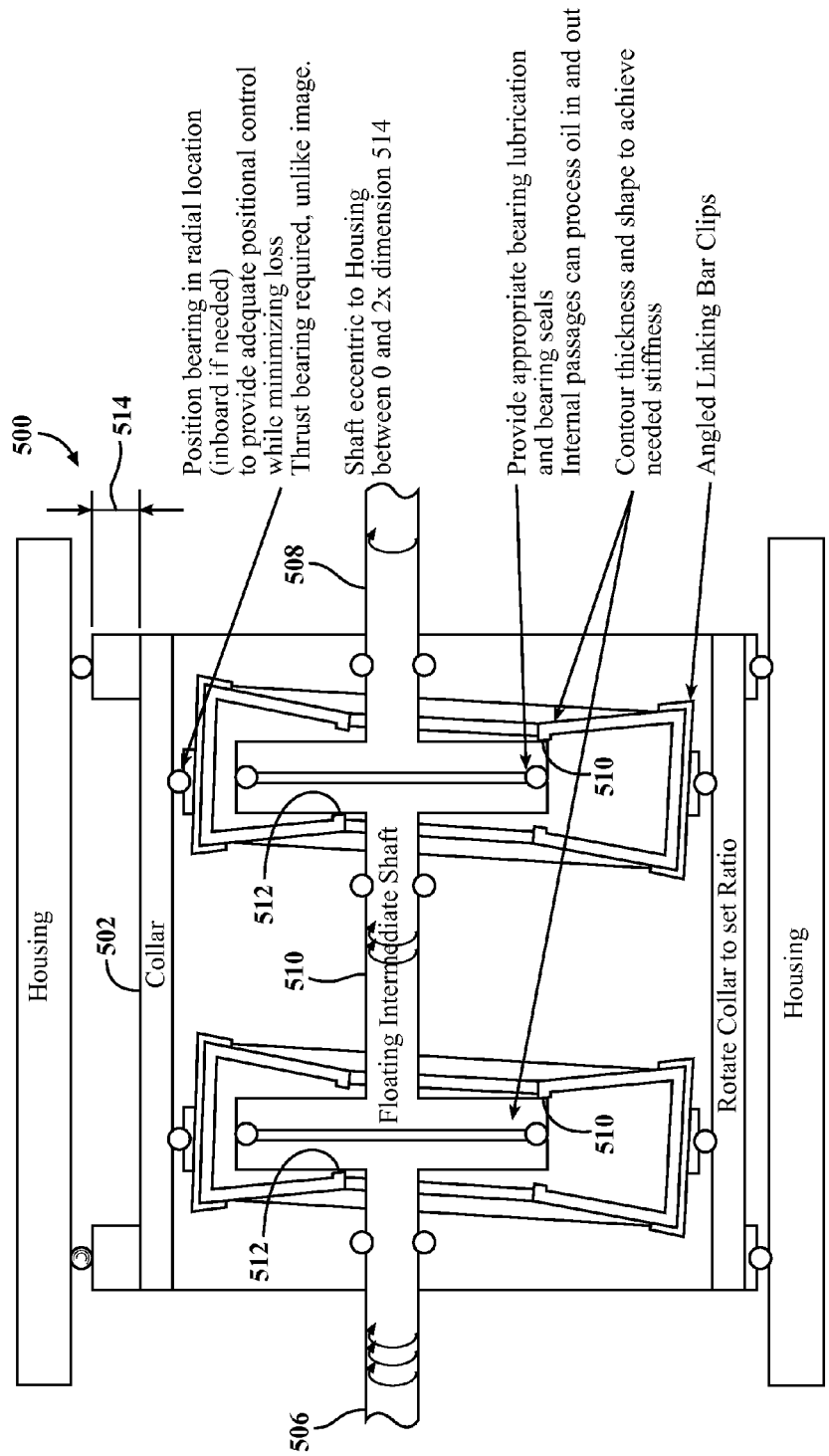
FIG. 30 is a schematic illustration of an exemplary two-stage continuously variable drive mechanism.
Figure 31:
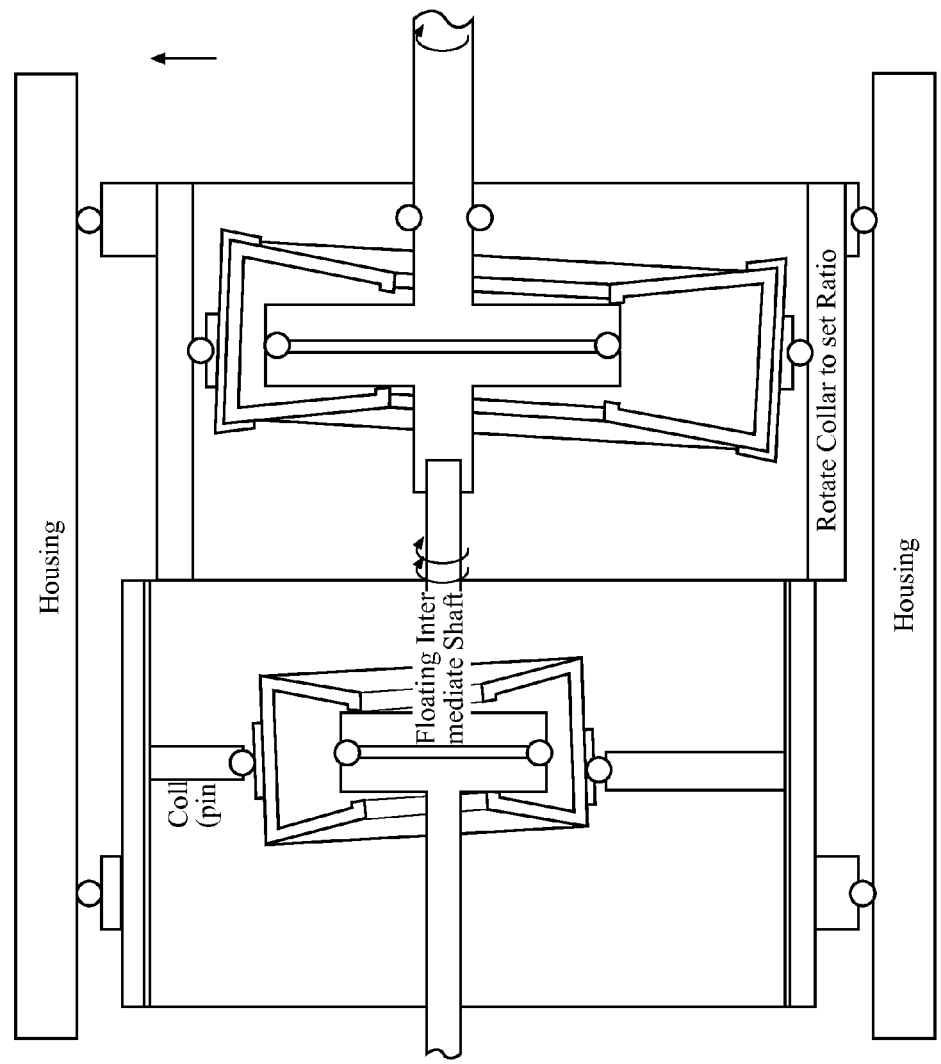
FIG. 31 is a schematic illustration of an alternately configured exemplary two-stage continuously variable drive mechanism.

With reference to FIG. 30, a two stage radial disk drive mechanism 500 may include a rotatable collar 502 operable for varying a speed ratio of the drive mechanism 500 by circumferentially rotating the collar 502. A speed ratio from an input shaft 506 to an output shaft 508 may be varied from approximately 1:9 to about 9:1. This range of ratios is achieved by rotating the collar 502 180 degrees. A beneficial feature of this configuration is that when transmitting motion at a 1:1 speed ratio, there may be substantially zero spin at contact patches 510 and 512. Flipping successive stages is a way to reduce shaft bending moments. Successive stages in a machine with step-down speed ratio experience increasing torque loads, needing larger diameters. These features are depicted in FIG. 31.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A drive mechanism comprising:
   an input member rotatable about an input axis of rotation and including a partial spheroid-shaped input traction surface;
   an output member rotatable about an output axis of rotation and including a partial spheroid-shaped output traction surface; and
   a ring member rotatable in a rotational plane, the ring member including a ring traction surface engaging the input traction surface of the input member and the output traction surface of the output member to rotatably couple the input member to the output member, wherein the ring member encircles the output member and the input member.

2. The drive mechanism of claim 1, wherein at least one of the input traction surface and the output traction surface has a spherical contour.

3. The drive mechanism of claim 2, wherein the ring traction surface has one of a cylindrical contour, conical contour and a spherical contour.

4. The drive mechanism of claim 1, wherein the input axis of rotation intersects the input traction surface of the input member at a first intersect and the output axis of rotation intersects the output traction surface of the output member at a second intersect, the rotational plane of the ring member extending between the first intersect and the second intersect.

5. The drive mechanism of claim 4, wherein an angular orientation of at least one of the input axis of rotation and the output axis of rotation is selectively adjustable relative to the other axis of rotation and an angular orientation of the rotational plane of the ring member is selectively adjustable relative to the input axis of rotation and the output axis of rotation.

6. The drive mechanism of claim 5, wherein the angular orientation of the ring member is adjustable in response to a change in angular orientation of at least one of the input axis of rotation and the output axis of rotation.

7. The drive mechanism of claim 6, wherein an angular orientation of the ring member relative to the input axis of rotation is maintained substantially equal to an angular orientation of the ring member relative to the output axis of rotation.

8. The drive mechanism of claim 1, wherein the ring member includes an input ring member and an output ring member spaced from the input ring member.

9. The drive mechanism of claim 8 further comprising at least one traction control link connecting the input ring member to the output ring member.

10. The drive mechanism of claim 9, wherein the traction control link is oriented at an oblique angle relative to a plane of at least one of the input ring member and output ring member.

11. The drive mechanism of claim 10, wherein the angular orientation of the traction control link is selectively adjustable relative to the plane of the at least one of the input ring member and the output ring member.

12. The drive mechanism of claim 1 further comprising a pivot bearing disposed between the input member and the output member.

13. The drive mechanism of claim 12 further comprising at least one of a second input shaft and a second output shaft fixedly attached to the pivot bearing for concurrent rotation therewith.

14. The drive mechanism of claim 12, wherein the pivot bearing comprises at least one of a sphere, disk and ring.

15. The drive mechanism of claim 1, wherein the ring traction surface includes an input traction segment and an output traction segment spaced from the input traction segment, the input traction segment engaging the input traction surface of the input member and the output traction segment engaging the output traction surface of the output member.

16. The drive mechanism of claim 15, wherein the entire input traction segment is spaced apart from the output traction surface of the output member and the entire output traction segment is spaced apart from the traction surface of the input member.

17. The drive mechanism of claim 1, where the ring traction surface is substantially circular.

18. The drive mechanism of claim 17, wherein at least one of the input traction surface and the output traction surface includes a substantially non-spherical shape.

19. The drive mechanism of claim 1, wherein an angular orientation of at least one of the input axis of rotation and the output axis of rotation is selectively adjustable relative to the other axis of rotation.

20. The drive mechanism of claim 1, wherein an angular orientation of the rotational plane of the ring member is selectively adjustable relative to at least one of the input axis of rotation and the output axis of rotation.

21. The drive mechanism of claim 1, wherein the ring member slideably engages at least one of the input and output traction surfaces.

22. A drive mechanism comprising:
   an input member rotatable about an input axis of rotation and including a partial spheroid-shaped input traction surface;
   an output member rotatable about an output axis of rotation and including a partial spheroid-shaped output traction surface; and a ring member rotatable in a rotational plane, the ring member including a ring traction surface engaging the input traction surface of the input member and the output traction surface of the output member to rotatably couple the input member to the output member, wherein the input axis of rotation intersects the input traction surface of the input member at a first intersect and the output axis of rotation intersects the output traction surface of the output member at a second intersect, the first and second intersects arranged on a common side of the rotational plane of the ring member.

23. The drive mechanism of claim 1, wherein one of the input member and the output member includes a concave pivot bearing surface, the traction surface of the remaining member slideably engaging the pivot bearing surface.

24. The drive mechanism of claim 1, wherein the traction surface of one of the input member and the output member engages the remaining member.

25. A method for selectively adjusting a traction force of drive mechanism, the method comprising:
   selectively rotating an input member about an input axis of rotation, the input member including a partial spheroidal-shaped input traction surface and operably connected to an output member rotatable about an output axis of rotation, the output member including a partial spheroidal-shaped output traction surface;
   rotating a ring member in a rotational plane in response to rotation of the input member about the input axis of rotation, the ring member including a ring traction surface engaging the input traction surface of the input member and the output traction surface of the output member to rotate the output member relative to the input member, wherein the ring member encircles the output member and the input member; and
   selectively adjusting a traction force between the ring traction surface and the input and output traction surfaces by applying a pivot bearing actuating force to a pivot bearing disposed between the input member and the output member and a ring member actuating force to the ring member, the pivot bearing rotatably supporting the input member relative to the output member.

26. The method of claim 25 further comprising applying the pivot bearing actuating force in a direction generally perpendicular to a plane of the pivot bearing.

27. The method of claim 25 further comprising applying the ring member actuating force in a direction generally perpendicular to the rotational plane of the ring member.

28. The method of claim 25 further comprising applying the ring member actuating force in a first direction and the bearing actuating force in an opposite second direction.

29. The method of claim 25 further comprising:
   detecting at least one of a lateral movement of the ring member along the rotational plane and traction force occurring between the ring member and at least one of the input member and the output member; and
   displacing the pivot bearing in a first direction and the ring member in an opposite second direction in response to at least one of the detected lateral movement of the ring member and the detected traction force.

30. The method of claim 25, wherein the input member includes an input pivot bearing cup and the output member includes an output pivot bearing cup, the input and output bearing cups slideably engaging the pivot bearing.

* * * * *